United States Patent
Mitsumori

(10) Patent No.: US 7,310,674 B2
(45) Date of Patent: Dec. 18, 2007

(54) LOAD BALANCER FOR NETWORK PROCESSOR

(75) Inventor: Yasuyuki Mitsumori, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 710 days.

(21) Appl. No.: 10/116,593

(22) Filed: Apr. 4, 2002

(65) Prior Publication Data
US 2003/0079004 A1    Apr. 24, 2003

(30) Foreign Application Priority Data
Oct. 18, 2001    (JP)    ............................. 2001-320959

(51) Int. Cl.
*G06F 9/46*    (2006.01)
*G06F 15/173*    (2006.01)

(52) U.S. Cl. ................... 709/226; 718/105; 718/102

(58) Field of Classification Search ............... 718/105, 718/102; 709/226
See application file for complete search history.

(56) References Cited

U.S. PATENT DOCUMENTS

| | | | |
|---|---|---|---|
| 6,701,323 B2 * | 3/2004 | Sashino et al. | ......... 707/103 R |
| 6,725,253 B1 * | 4/2004 | Okano et al. | ............... 709/203 |
| 2001/0034752 A1 * | 10/2001 | Kremien | ..................... 709/105 |
| 2001/0037476 A1 * | 11/2001 | Yamamoto | ................... 714/37 |
| 2002/0040402 A1 * | 4/2002 | Levy-Abegnoli et al. | ... 709/229 |

FOREIGN PATENT DOCUMENTS

JP    2000-083055    3/2000

* cited by examiner

*Primary Examiner*—Meng-Al T. An
*Assistant Examiner*—Kenneth Tang
(74) *Attorney, Agent, or Firm*—Katten Muchin Rosenman LLP

(57) ABSTRACT

A load balancer for a network processor has load balance control units that are multistage-connected in series with each other. When distribution destinations of input information concentrates into a specific network processor by distribution process executed by a load balance control unit, the load balance control unit of next stage execute the distribution process about the input information distributed to the specific network processor.

9 Claims, 16 Drawing Sheets

*FIG. 8A*
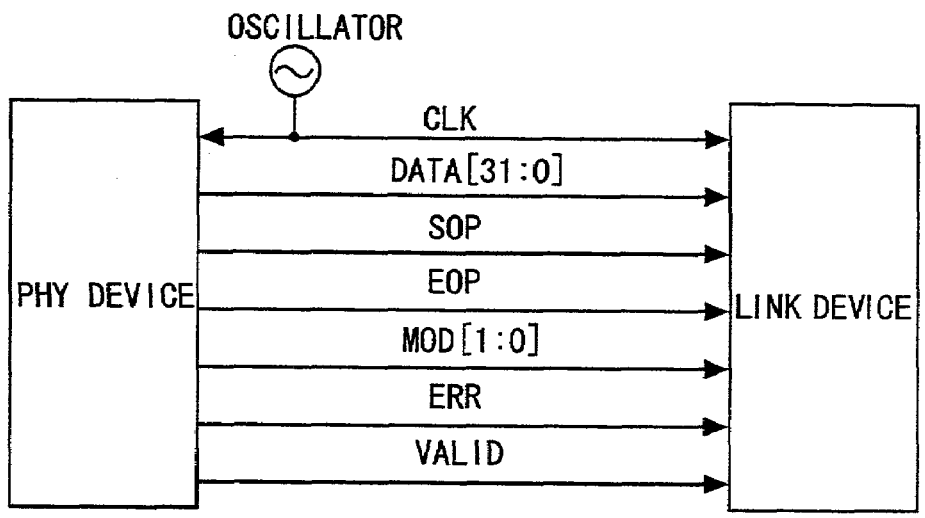
*FIG. 8B*
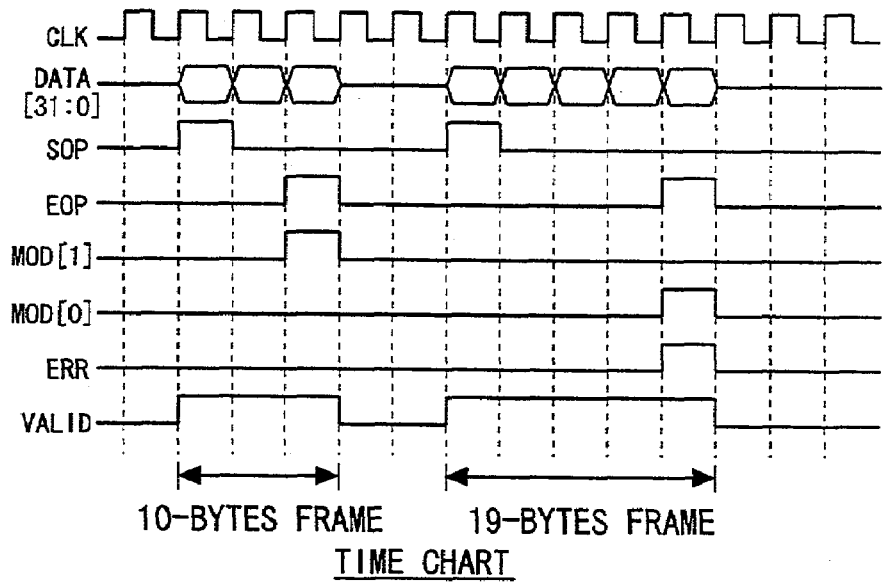
TIME CHART
*FIG. 8C*
| STATE OF MOD [1:0] | MEANING |
|---|---|
| MOD [1:0] =00 | DATA[31:0] IS VALID DATA |
| MOD [1:0] =01 | DATA[7:0] IS INVALID DATA |
| MOD [1:0] =10 | DATA[15:0] IS INVALID DATA |
| MOD [1:0] =11 | DATA[23:0] IS INVALID DATA |
MOD FUNCTION EXPLANATION TABLE

FIG. 16A

ROUTE NUMBER CONVERSION TABLE
(NORMAL CASE)

| RESIDUAL | ROUTE SELECTION SIGNAL | DESTINATION NWP |
|---|---|---|
| 0 | 0 | NWP#1 |
| 1 | 1 | NWP#2 |
| 2 | 2 | NWP#3 |
| 3 | 3 | NWP#4 |
| 4 | 4 | NWP#5 |
| 5 | 5 | NWP#6 |
| 6 | 6 | NWP#7 |
| 7 | 7 | NWP#8 |

(※) MAXIMUM DEGREE OF GENERATION POLYNOMIAL IN THIS CASE IS 8

FIG. 16B (CASE IN WHICH NWP3 IS TROUBLED)

| RESIDUAL | ROUTE SELECTION SIGNAL | DESTINATION NWP |
|---|---|---|
| 0 | 0 | NWP#1 |
| 1 | 1 | NWP#2 |
| 2 | 3 | NWP#4 |
| 3 | 4 | NWP#5 |
| 4 | 5 | NWP#6 |
| 5 | 6 | NWP#7 |
| 6 | 7 | NWP#8 |
| --- | --- | --- |

(※) MAXIMUM DEGREE OF GENERATION POLYNOMIAL IN THIS CASE IS 7

FIG. 16C (CASE IN WHICH NWP3 AND NWP5 ARE TROUBLED)

| RESIDUAL | ROUTE SELECTION SIGNAL | DESTINATION NWP |
|---|---|---|
| 0 | 0 | NWP#1 |
| 1 | 1 | NWP#2 |
| 2 | 3 | NWP#4 |
| 3 | 5 | NWP#6 |
| 4 | 6 | NWP#7 |
| 5 | 7 | NWP#8 |
| --- | --- | --- |
| --- | --- | --- |

(※) MAXIMUM DEGREE OF GENERATION POLYNOMIAL IN THIS CASE IS 6

LOAD BALANCER FOR NETWORK PROCESSOR

BACKGROUND OF THE INVENTION

1. Field of the Invention

The present invention relates to a load balancer, applied to a communication device on which a plurality of network processors having functions such as routing or address searching are mounted, for performing load balance control for frame processes to the respective network processors.

2. Description of the Related Art

In recent years, with an increase in Internet population, an amount of data processed on the Internet rapidly increases. Accordingly, in a communication device such as a router or a switch, loads relating to a routing and/or switching process for a communication frame (packet) such as an IP (Internet Protocol) and the like and a searching process of addresses and the like rapidly increase. For this reason, an improvement in performance of the communication device and an improvement in processing capability are required. Therefore, a network processor, which satisfies a processing capacity required for the communication device must be mounted on the communication device.

However, the processing capacity of the respective network processors cannot always satisfy requirements based on the rapid increase in the Internet communication. In this case, a plurality of network processors having poor processing capacity is mounted on the communication device, and these network processors perform parallel processing. Thus, load balance controls to these network processors must be performed in order to prevent that the loads given to each of the network processors exceed the processing capacity of the respective network processors.

In a conventional technique, when a load balance process is performed to network processors mounted in parallel to each other, transmission routes are distributed on the basis of information such as the addresses or the like of respective frames, and the frames are transmitted to the respective network processors. In addition, a plurality of control parameters used when the route distribution is calculated is set in advance. When the eccentricity (imbalance or disproportion) of the distribution such that the distributed frames are concentrated on a specific network processor cause, the destinations of the frame distribution (distribution pattern) are changed into alternative destinations (alternative distribution pattern) at once by changing the control parameters. In this manner, the eccentricity of the frame distribution is solved.

However, in the conventional technique, the destinations of frame distribution are changed at once. For this reason, before and after the change of the parameters, the destination of distribution of all the frames may be changed. At this time, frames transmitted to routes (network processors), which are not eccentrically distributed, may be transmitted to different routes (network processors) depending on the change of the control parameters. In this case, the continuation of the frames is broken. For this reason, the frames are disconnected, and the frames cannot be correctly communicated. When the dynamic change of the control parameters is frequently performed, the reliability of the communication device may be deteriorated.

SUMMARY OF THE INVENTION

It is an object of the present invention to provide a load balancer for network processors in which when distribution destinations of input information are eccentric to a specific network processor, the eccentricity can be solved without adversely affecting input information distributed to another network processor.

The present invention employs the following configuration to achieve the above-mentioned object.

More specifically, a first aspect of the present invention is a load balancer for network processors. The load balancer is arranged in a communication device including receiving unit and a plurality of network processors for performing processes for input information received by the receiving unit. The load balancer includes a plurality of load balance control units. The plurality of load balance control units is multistage-interconnected in series with each other. Each of the load balance control units receives the input information from the receiving means and executes distribution processes for distributing the input information to one of the network processors according to a predetermined distribution condition per input information. Further, each of the load balance control units of the second and subsequent stages supervises a distribution process executed by the load balance control unit of the previous stage, and distributes, when distribution destinations of the input information by the load balance control unit of the previous stage concentrates into a specific network processor, the input information distributed to the specific network processor by the load balance control unit of the previous stage to alternative network processor according to a distribution condition different from the distribution condition used in the load balance control unit of the previous stage.

According to the present invention, when imbalance (disproportion) of the distribution destination of the input information (e.g., frames or packets) is caused at a load balance control unit, a load balance control unit of next stage automatically executes the distribution process (redistribution) with regard to the input information distributed to a specific distribution destination (distribution route) at the load balance control unit of the previously stage. In this manner, the imbalance of the distribution destination is rapidly solved without adversely affecting input information distributed to another distribution destination.

The load balancer according to the present invention preferably further includes an update control unit which supervises a distribution process executed by a load balance control unit of the final stage and updates distribution conditions used in all the load balance control units when distribution destinations of the input information by the load balance control unit of the final stage concentrates into a specific network processor. In this manner, when the eccentricity of the load balance is not solved by using the load balance control units of all the stages, each distribution condition (parameter) of all the load balance control units are automatically updated, and appropriate load balancer can be finally provided for a network form.

The load balancer according to the present invention is preferably constituted such that each of the load balance control units distributes the input information received from the receiving means to a predetermined network processor without executing the distribution processes. In this manner, a function that efficiently performs development evaluation can be added to the load balancer according to the present invention.

A load balancer according to the present invention is preferably constituted such that each of the load balance control units changes, when a failure caused on one of the plurality of network processors, a distribution conditions used on the distribution process into alternative distribution condition corresponding to distribution destinations except for the network processor having the failure. In this manner, the load balancer also includes a function of continuing optimum load balance control even in generation of a trouble, so that the reliability of the entire load balance system can be improved.

A second aspect of the present invention is a communication device. The communication device includes receiving unit, a plurality of network processors for performing processes for input information received by the receiving unit, and a load balancer. The load balancer includes a plurality of load balance control units that are multistage-connected in series with each other. Each of the load balance control units receives the input information from the receiving means and executes distribution processes for distributing the input information to one of the network processors according to a predetermined distribution condition per input information. Further, each of the load balance control units of the second and subsequent stages supervises a distribution process executed by the load balance control unit of the previous stage, and distributes, when distribution destinations of the input information by the load balance control unit of the previous stage concentrates into a specific network processor, the input information distributed to the specific network processor by the load balance control unit of the previous stage to alternative network processor according to a distribution condition different from the distribution condition used in the load balance control unit of the previous stage.

The second aspect of the present invention is preferably constituted such that abnormal input information received by the receiving unit is discarded without being given to one of the network processors. In this manner, the input information given to the network processor decreases, and a load on the network processor is reduced.

A third aspect of the present invention is a communication device. The communication device includes receiving means, a plurality of network processors for performing processes for input information received by the receiving means, and a plurality of load balancers. Each of the load balancers includes a plurality of load balance control units that are multistage-connected in series with each other. Each of the load balance control units receives the input information from the receiving unit and executes distribution processes for distributing the input information to one of the network processors according to a predetermined distribution condition per input information, and each of the load balance control units of the second and subsequent stages supervises a distribution process executed by the load balance control unit of the previous stage, and distributes, when distribution destinations of the input information by the load balance control unit of the previous stage concentrates into a specific network processor, the input information distributed to the specific network processor by the load balance control unit of the previous stage to alternative network processor according to a distribution condition different from the distribution condition used in the load balance control unit of the previous stage. When one of the load balancers is used as an active-system and the other load balancers serve as standby-systems, distribution conditions which are being used in the plurality of load balance control units included in the load balancer serving as the active-system are set in the load balance control units included in the load balancers serving as the standby-systems.

According to the third aspect, even though the communication device has a function that continues optimum load balance control even though the communication device has a redundant configuration, so that the reliability of the entire load balance system can be improved.

BRIEF DESCRIPTION OF THE DRAWINGS

FIG. 8A is a diagram showing a configuration image of a POS-PHY interface, FIG. 8B is a time chart of a signal transmitted from a PHY device to a LINK device, and FIG. 8C is a table for explaining functions of MOD [1:0];

FIGS. 16A, 16B, and 16C are diagrams showing route number conversion tables.

DESCRIPTION OF THE PREFERRED EMBODIMENTS

Preferred embodiments of the present invention will be described below with reference to the accompanying drawings.

Principle of the Present Invention

Figure 1:
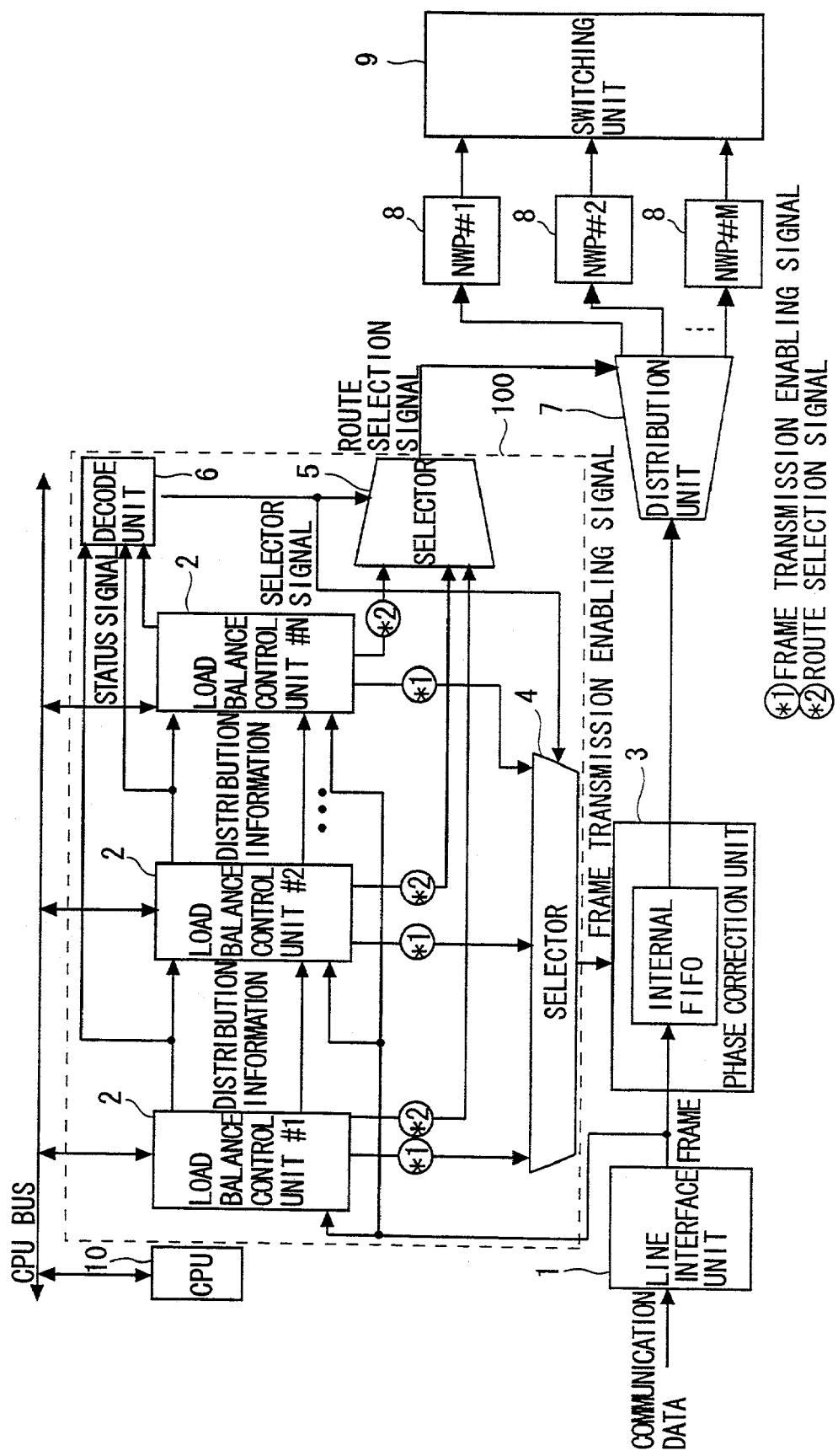
FIG. 1 is a diagram for explaining the principle of the present invention.

FIG. 1 is a diagram for explaining the principle of the present invention. FIG. 1 shows a load balancer 100 and main elements of a communication device on which the load balancer 100 is mounted. The communication device outputs communication data (to be referred to as a "frame" hereinafter) serving as input information transmitted from the outside to an output route depending on the destination of the communication data. As the communication device, a router, a layer three switch, a MPLS label switch, and a combination thereof can be illustrated.

In FIG. 1, as main constituent elements of the communication device, a line interface unit 1 serving as a receiving means, the load balancer 100, a phase correction unit 3, a distribution unit 7, a plurality of network processors (to be referred to as "NWPs" hereinafter) 8, a switching unit (to be referred to as an "SW" hereinafter) 9, and a CPU 10 serving as a control means.

The line interface unit 1 receives a frame from the outside of the communication device. The frame received by the line interface unit 1 is given to the load balancer 100 and the phase correction unit 3.

The load balancer 100 uses information such as an address or the like held by the frame input from the line interface unit 1 to perform a distribution process (assignment of a frame process to the NWP 8) for routes for transmitting the frame to the NWPs 8 such that loads on the plurality of NWPs 8 are balanced. The load balancer 100 gives a frame transmission enabling signal based on the result of the distribution process to the phase correction unit 3 and gives a route selection signal to the distribution unit 7.

The phase correction unit 3 comprises an FIFO (first-In-first-Out) therein. The phase correction unit 3 receives a frame transmitted from the line interface unit 1 and temporarily accumulates the frame in the FIFO until the phase correction unit 3 receives the frame transmission enabling signal from the load balancer 100 (selector 4 of the load balancer 100). The phase correction unit 3 transmits the frame to the distribution unit 7 according to the frame transmission enabling signal from the load balancer 100.

The distribution unit 7 distributes the frame received from the phase correction unit 3 to an arbitrary NWP 8 according to the route selection signal transmitted from the load balancer 100 (selector 5 of the load balancer 100).

Each of the NWPs 8 performs a routing process, an address filtering process, and the like for a frame received from the distribution unit 7 to add a routing header to the frame and to transmit the frame to SW 9. It is assumed that the processing capability of one NWP 8 is lower than a processing capability for frames transmitted from the line interface unit 1 at a full rate. For this reason, in order to make it possible to process the frames transmitted at the full rate, M (M is an integer which is 1 or more) NWPs 8 are mounted in parallel to each other. When a specific NWP 8 is designated, the NWP 8 is expressed as "NWP 8-#Y (Y=1, 2, 3, ..., M−1, M; Y is an integer which is 1 or more indicating a number assigned to the NWP 8)".

The SW 9 performs a switching process of frames by using the routing headers or the like added to frames input from the NWPs 8. The CPU 10 performs various settings to a load balance control unit 2 in the load balancer 100 through a CPU bus.

The load balancer 100 comprises a plurality of load balance control units 2, a selector 4, a selector 5, and a decode unit 6 to balance loads on the NWPs 8. The plurality of load balance control units 2 are multistage-connected to each other. When a specific load balance control unit 2 is designated, the load balance control unit 2 is expressed as "load balance control unit 2-#X (X=1, 2, 3, ..., N−1, N; X is an integer which is 1 or more indicating a stage number)". In FIG. 1, N (N is an integer which is 1 or more) load balance control units 2 are connected in series with each other on N stages. The load balance control unit 2 has a CPU bus interface. The load balance control unit 2 is subjected to various settings by software under the control of the CPU 10.

The load balance control units 2 receives frames transmitted from the line interface unit 1, and performs processes (load balance control) of distributing the frames to an arbitrary NWP 8 according to parameters set by the CPU 10 on the basis of protocol IDs and address values included in the header of the frames.

In FIG. 1, the result of the distribution process by the load balance control unit 2 of the previous stage is communicated to the load balance control unit 2 of the next stage as distribution information. Each load balance control unit 2 transmits frame transmission enabling signals to the selector 4 upon completion of the distribution process of frames, and transmits route selection signals to the selector 5. In addition, each load balance control unit 2 gives status signals to the decode unit 6.

The selector 4 selects one of the frame transmission enabling signals given by the load balance control units 2. This selection is performed depending on a selector signal received from the decode unit 6.

The selector 5 selects one of the route selection signals given by the load balance control units 2. This selection is performed depending on a selector signal received from the decode unit 6.

The decode unit 6 receives a status signal representing an ON/OFF state of each of the load balance control units 2. The decode unit 6 transmits a decoded selector signal to the selector 4 and the selector 5 such that a frame transmission enabling signal and a route selection signal transmitted from the load balance control unit 2 in the last stage of the load balance control units 2 are selected by the selector 4 and the selector 5, respectively.

An operation of the load balancer 100 according to the present invention will be described below with reference to FIG. 1. The distribution processes (load balance control) performed by the plurality of load balance control units 2 are started when the operation of the load balancer 100 is started (e.g., after the power supply of the communication device is turned on or after a reset is canceled). At this time, only load a balance control for the load balance control unit 2-#1 of the first stage is set in an ON state, and load balance controls for the other load balance control units 2 are set in OFF states. The load balance control units 2 are set in such states that status signals representing the ON/OFF states of the corresponding load balance controls are always communicated to the decode unit 6.

As initial settings performed after power on/reset cancel, the CPU 10 performs settings required for load balance of the NWPs 8 to the load balance control units 2. The settings performed here include an ON/OFF setting of load balance control and a setting of parameters used in distribution of frames. In addition, the initial settings can also include an ON/OFF setting of a test mode.

The distribution process (load balance control) of frames is executed according to a predetermined distribution condition. The distribution condition can be obtained by arithmetically operating a conditional expression. For example, a method of performing distribution of frames according to the following distribution conditions. That is, division of an address stored in a received frame is performed by a generation polynomial, the residual of the division is selected as a route number (route selection number) representing a distribution destination, and the frame is distributed to the NWP 8 having a number (assigned in advance) of the NWP 8 corresponding to the route selection number.

In this case, the parameter indicates a generation polynomial. When distribution of frames is concentrated on a specific route in a distribution process of frames, a plurality of different generation polynomials are set for the load balance control units 2 such that distribution results of different frames can be obtained by changing distribution conditions by dynamic changes of the parameters.

When the line interface unit 1 receives frames, the line interface unit 1 transmits the frames to the load balance control units 2 and the phase correction unit 3.

When each load balance control unit 2 receives the frames from the line interface unit 1, each load balance control unit 2 checks protocol IDs and addresses stored in the frames. However, in this state, since only the load balance control unit 2-#1 of the first stage is set in an ON state, only the load balance control unit 2-#1 begins to check the protocol IDs and the addresses of the frames.

The protocol ID indicates, e.g., a protocol ID regulated by the PPP (Point to Point Protocol) when the line interface is a POS (Packet Over SONET/SDH) interface. The addresses indicate a destination address and a source address that are regulated by protocols such as IPv4 (Internet Protocol version 4) and IPv6 (Internet Protocol version 6), respectively.

The load balance control unit 2-#1 performs a distribution arithmetic operation in units of frames according to the set generation polynomials. More specifically, the load balance control unit 2-#1 checks a storage area of the addresses of the frames, divides the address value by a generation polynomial, acquires a residual obtained as a result of the division as a route selection number, and communicates a signal including the route selection number to the selector 5 as a route selection number.

The load balance control unit 2-#1 transmits a frame transmission enabling signal to the phase correction unit 3 upon completion of the arithmetic operation of the distribution. The other load balance control units 2-#2 to N that are set in OFF states do not perform distribution processes for the received frames.

The decode unit 6 receives status signals from the load balance control units 2, decodes the status signals to generate selector signals, and transmits the selector signals to the selector 4 and the selector 5. When only the load balance control unit 2-#1 is in an ON, the decode unit 6 generates a selector signal such that the route selection signal and the frame transmission enabling signal transmitted from the load balance control unit 2-#1 are selected.

The phase correction unit 3 temporarily accumulates receives frames in the FIFO until the frame transmission enabling signal transmitted from the selector 4. When the frame transmission enabling signal is turned on (frame transmission enabling signal is received from the selector 4), the phase correction unit 3 transmits the frames accumulated in the FIFO to the distribution unit 7.

The distribution unit 7 transmits the frames received from the phase correction unit 3 to a corresponding NWP 8 according to the route selection signal transmitted from the selector 5.

The NWPs 8 perform a routing process and an address filtering process to the frame received from the distribution unit 7, add routing headers or the like to the frames, and transmits the frames to the SW 9. The SW 9 performs a switching operation according to the routing header or the like of a frame, and transmits the frame to an appropriate output route.

With the above operations, the frames received by the line interface unit 1 are distributed according to parameters set in the load balance control unit 2-#1, and are given to the NWP 8 corresponding to the distribution result. In this manner, the load balance control of frame processes is performed.

A case in which eccentricity is generated in distribution will be described below. When eccentricity is generated in a distribution process performed by the load balance control unit 2-#1 to concentrate frame distribution on a specific NWP 8, a load balance control unit 2-#2 existing in the stage immediately behind (next to) the load balance control unit 2-#1 recognizes eccentricity of distribution destinations by distribution information transmitted from the load balance control unit 2-#1.

In this case, when the load balance control unit 2-#2 is in an OFF state, and the eccentricity of frame distribution is detected by the load balance control unit 2-#1 in the previous stage, the load balance control unit 2-#2 switches the state of the load balance control thereof to an ON state and performs a distribution process (re-distribution) to only frames of the route in which eccentricity is generated.

In the load balance control unit 2 (load balance control unit 2-#2) existing in the subsequent stage, a generation polynomial different from a generation polynomial used in the distribution process in the load balance control unit 2 (load balance control unit 2-#1) of the previous stage is set in an initial setting by the CPU 10 as a generation polynomial used in the re-distribution. The different generation polynomial is designed such that a residual for selecting a route in which eccentricity is generated cannot be calculated. For this reason, distribution conditions in the next stage are different from the distribution conditions in the previous stage. Therefore, the re-distribution result is different from the distribution result obtained in the previous stage as a matter of course, and frames distributed to the route (distribution destination) in which eccentricity is generated in the previous stage are divergently distributed to other routes. In this manner, the eccentricity is solved.

On the other hand, with respect to frames not to be re-distributed, the load balance control unit 2-#2 uses distribution information from the load balance control unit 2-#1 to transmit a frame transmission enabling signal to the selector 4 and to transmit a route selection signal to the selector 5.

When the load balance control unit 2-#2 is turned on, a status signal given from the load balance control unit 2-#2 to the decode unit 6 is switched from OFF to ON. The decode unit 6 is designed such that the frame transmission enabling signal and the route selection signal of the load balance control unit 2 existing in the last stage of the load balance control units 2 which are in ON states. For this reason, the decode unit 6 transmits a selector signal for selecting the frame transmission enabling signal and the route selection signal of the load balance control unit 2-#2 to the selector 4 and the selector 5.

In addition, when the eccentricity is not solved by the re-distribution process performed by the load balance control unit 2-#2, the load balance control of the load balance control unit 2 (load balance control unit 2-#3) of the next stage is turned on the basis of distribution information from the load balance control unit 2-#2 to perform the same re-distribution process as described above.

As described above, when eccentricity is generated in distribution of frames by the load balance control unit 2 of the previous stage, the load balance control unit 2 of the next stage distributes only frames for the route in which the eccentricity is generated again. In this manner, the eccentricity is solved, and the communication device continuously processes frames to the routes in which no eccentricity is generated without being adversely affected by re-distribution. For this reason, the continuity of the frames is maintained, and communication using the frames can be continued.

Figure 2:
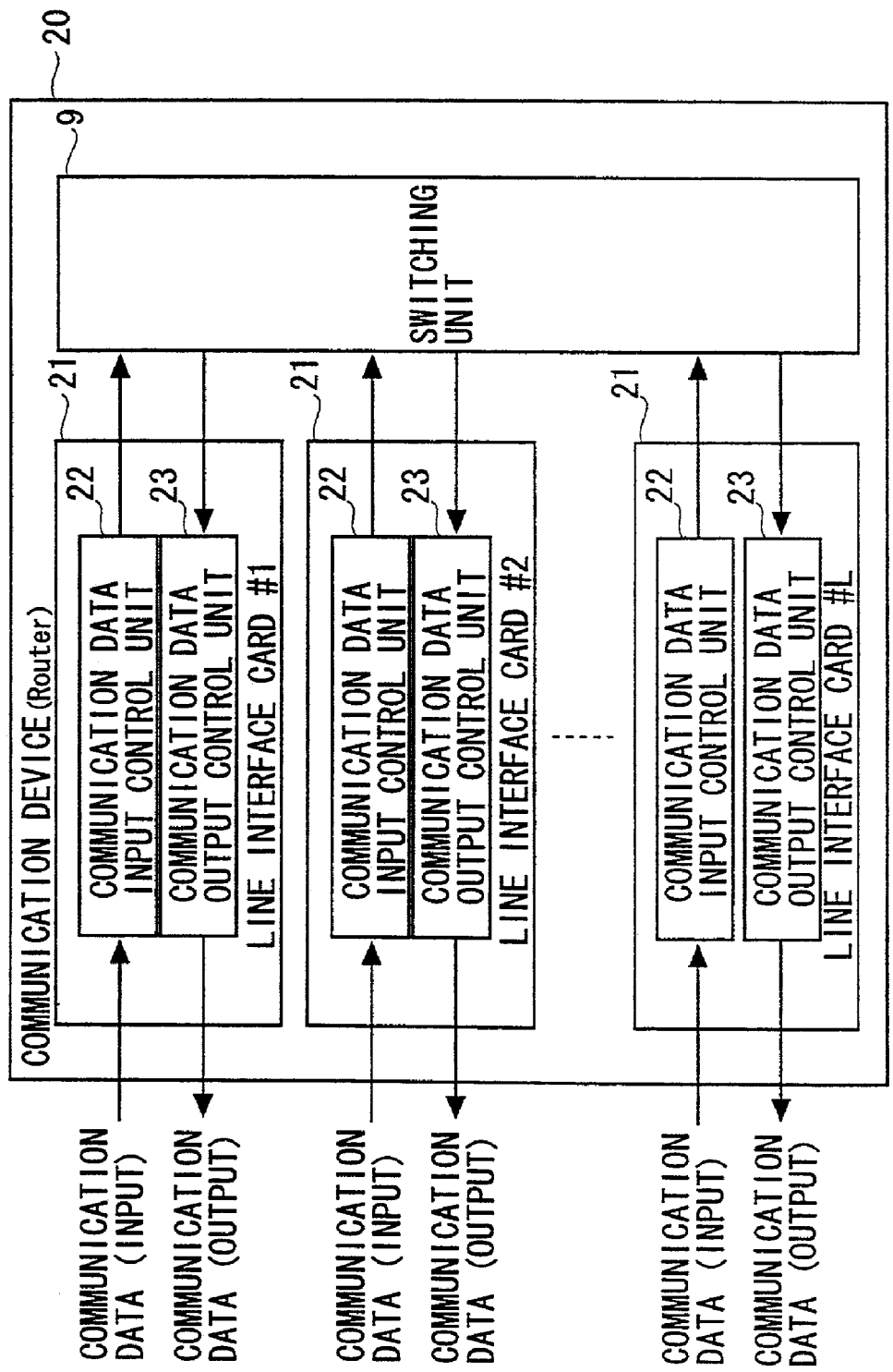
FIG. 2 is a diagram showing the configuration of a communication device on which a load balancer according to the present invention is mounted.
Figure 3:
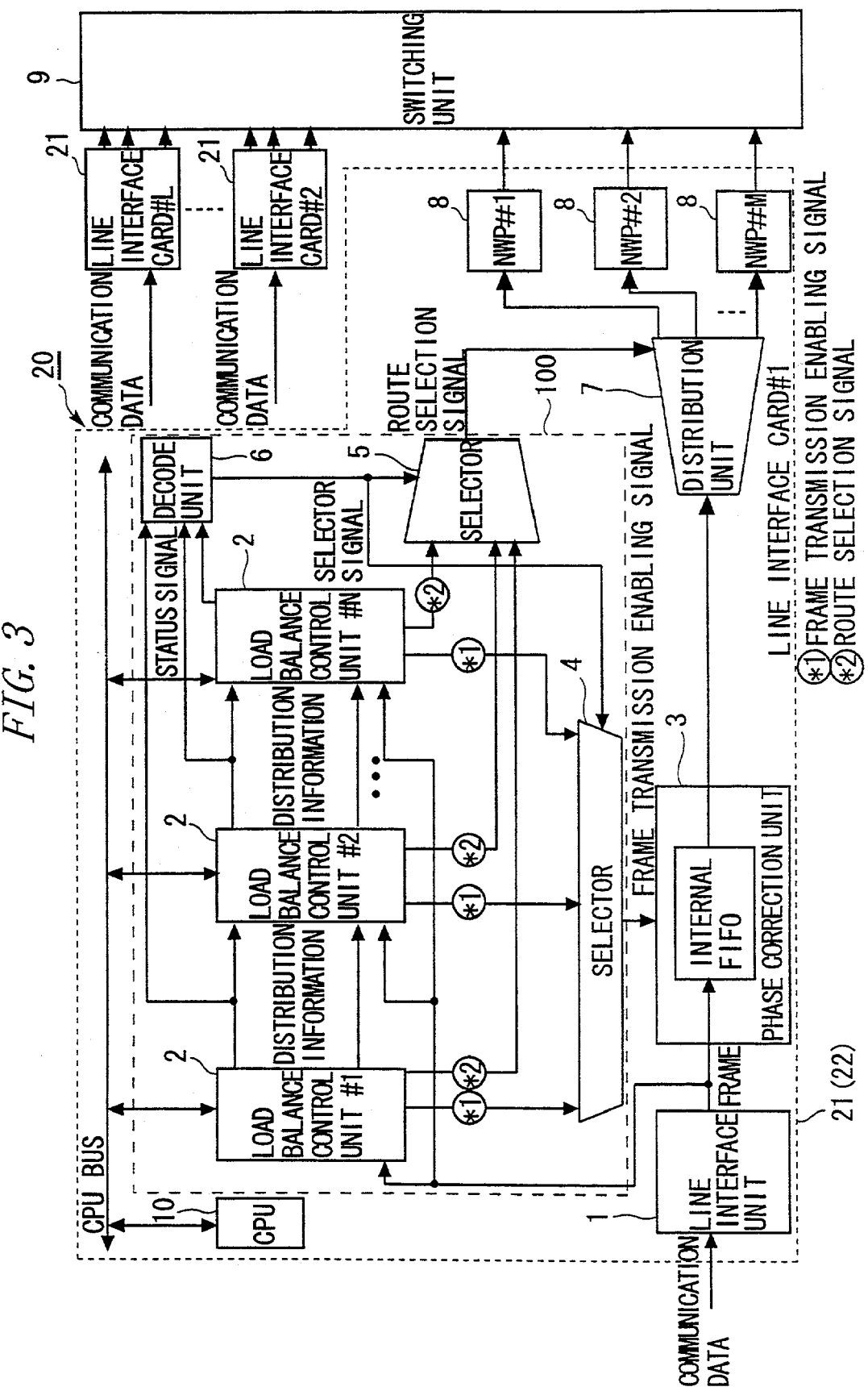
FIG. 3 is a diagram showing the configuration of a communication device on which a load balancer according to the present invention is mounted.

FIGS. 2 and 3 are diagrams showing the configurations of a communication device 20 on which the load balancer shown in FIG. 1. In FIG. 2, the communication device 20 is, e.g., a router, and comprises a switching unit (SW) and at least one line interface cards 21 (in FIG. 2, L (L is an integer which is 1 or more) line interface cards) which are connected in parallel to the SW 9.

Each of the line interface cards 21 comprises a communication data input control unit 22 for controlling communication data (frame) serving as input information input from the outside of the communication device 20 and a communication data output control unit 23 for controlling a frame output from the SW 9.

FIG. 3 shows the configuration of the communication data input control unit 22 in the line interface cards 21 (for example #1) shown in FIG. 2. The configuration shown in FIG. 1 corresponds to the configuration of the communication data input control unit 22. In this manner, the load balancer 100 is arranged in, e.g., a communication data input control unit of the line interface card mounted on the communication device. The "communication device" indicates both an interface device such as the line interface cards 21 having the communication data input control unit 22 and an exchanger such as a layer three switch or a MPLS label switch.

Embodiment 1

Figure 4:
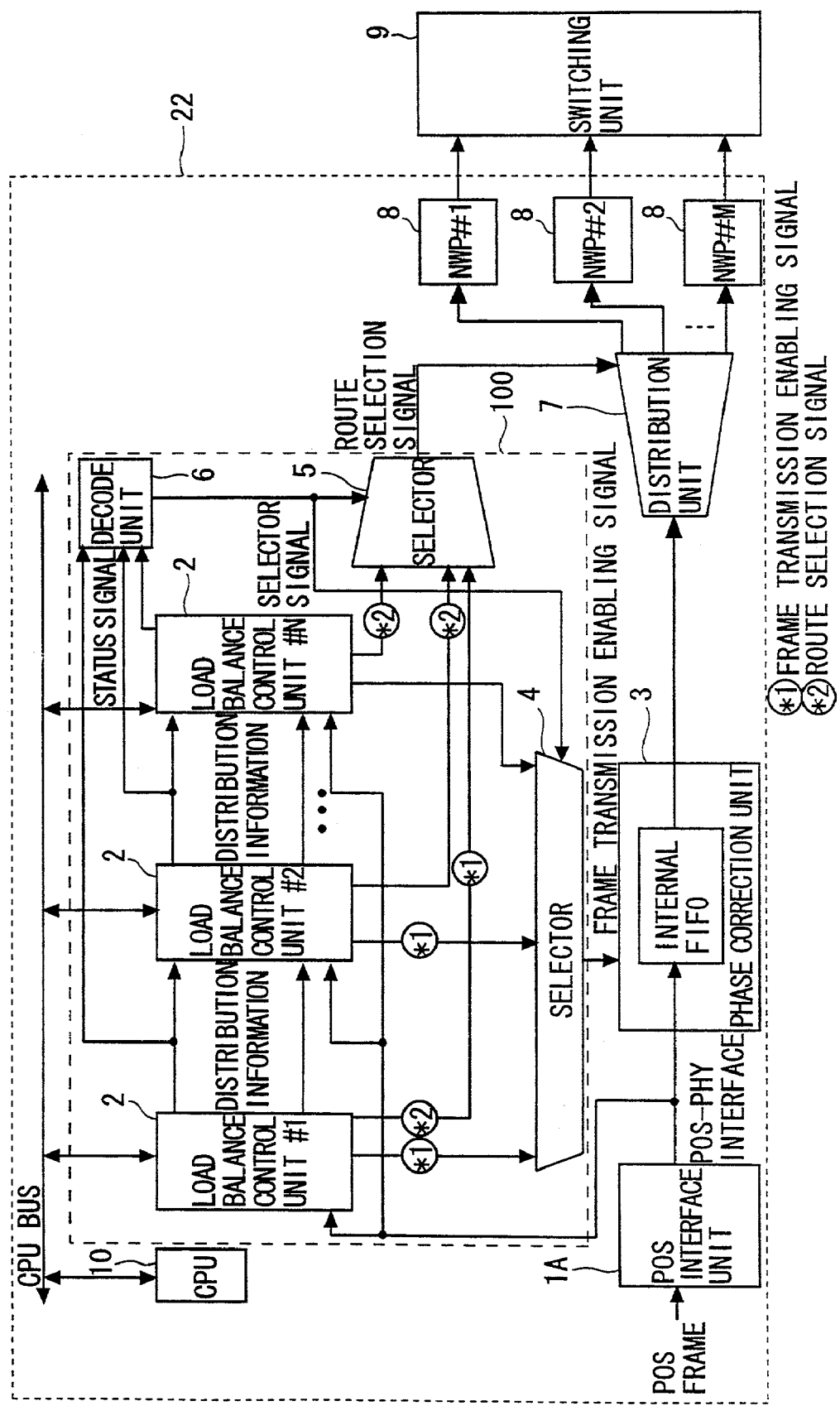
FIG. 4 is a block diagram showing the first embodiment of a load balancer.
Figure 5:
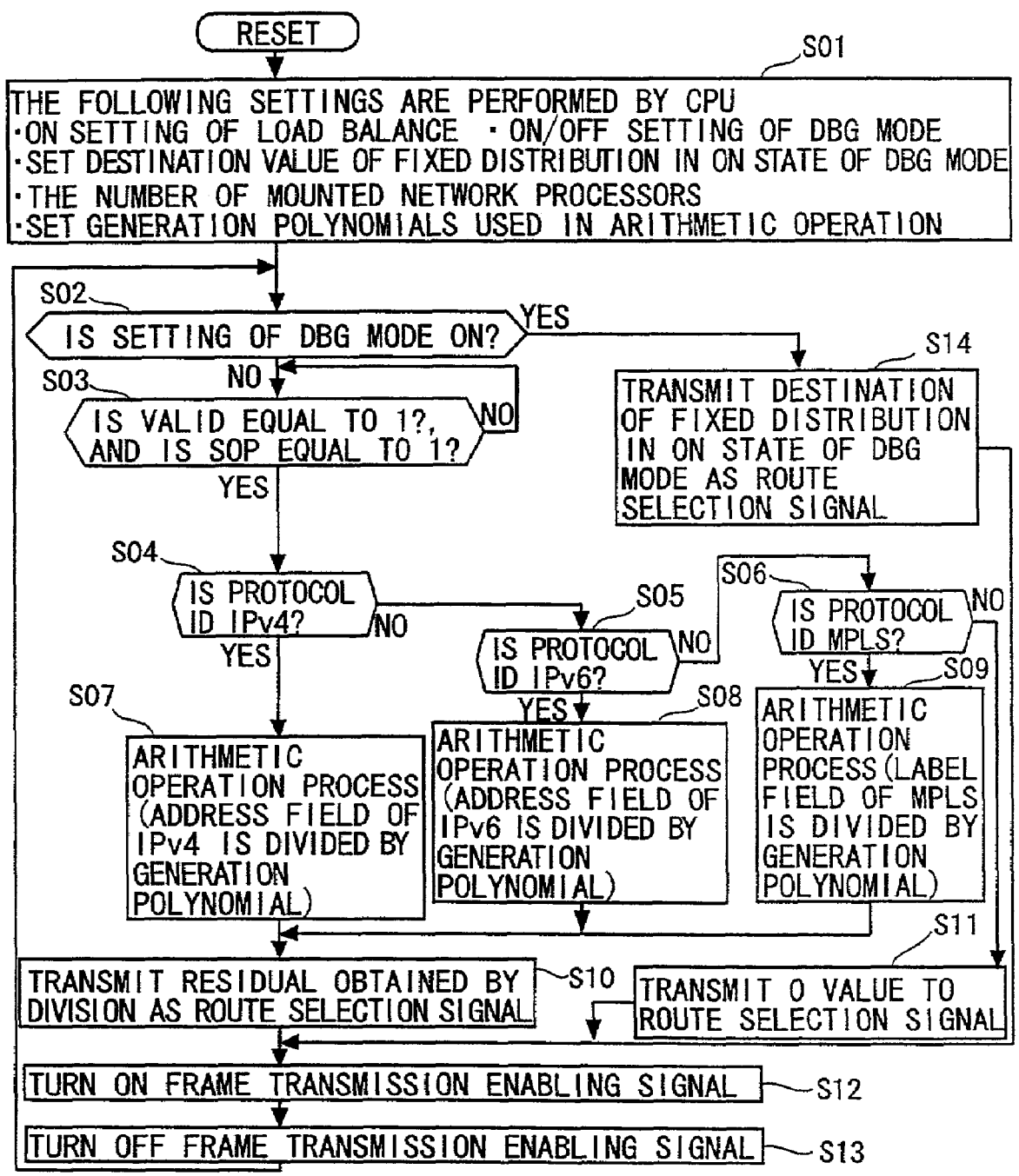
FIG. 5 is a flow chart showing a distribution process performed by a load balance control unit of the first stage.
Figure 6:
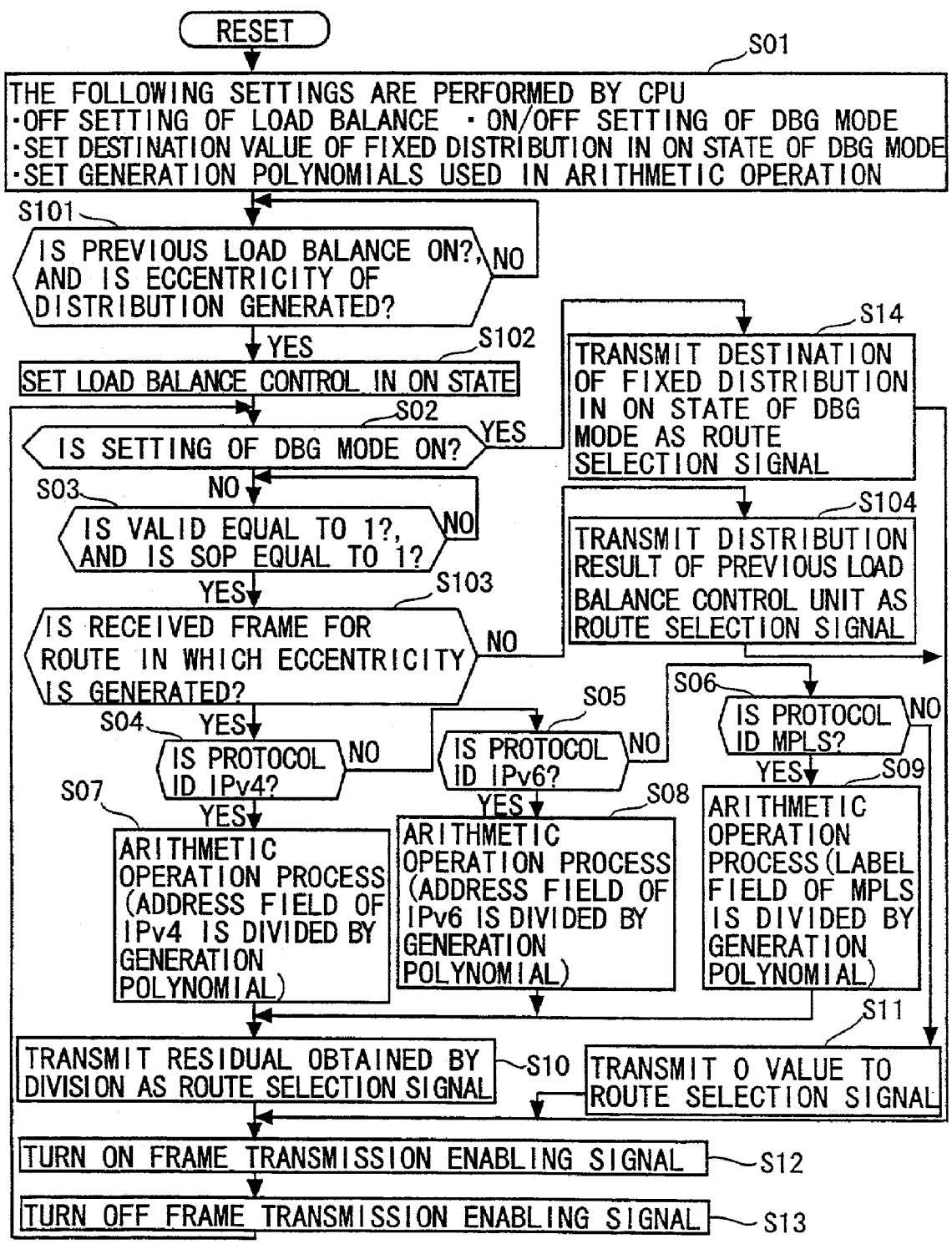
FIG. 6 is a flow chart showing a distribution process (re-distribution process) performed by the load balance control units of the second and subsequent stages.
Figure 7:
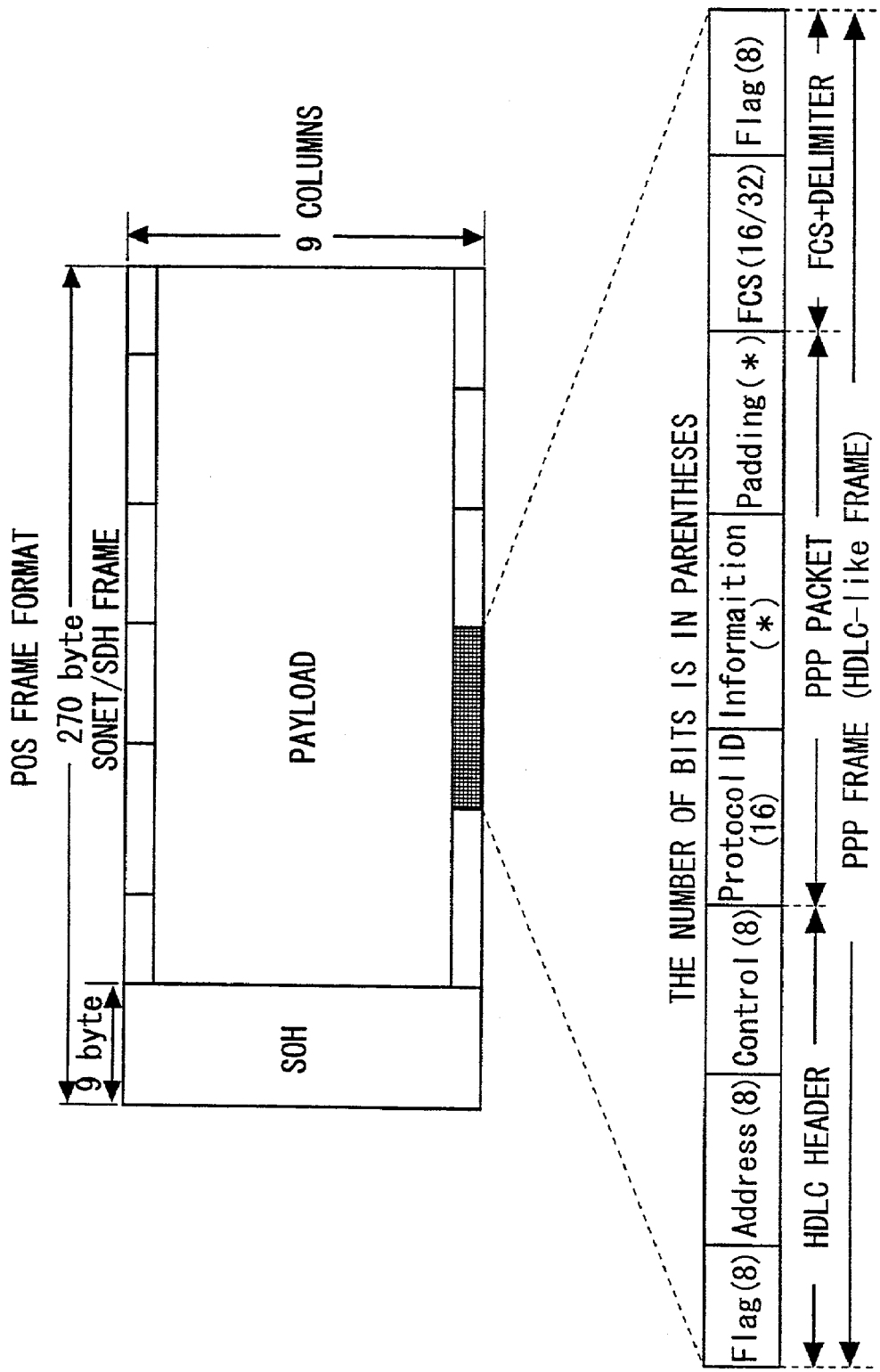
FIG. 7 is a diagram showing a format of a POS frame processed in the first embodiment.

The first embodiment of the present invention will be described below with reference to FIGS. 4 to 8. FIG. 4 is a block diagram showing a main constituent element (a communication data input control unit 22 of a line interface cards 21) of a communication device 20 on which a load balancer 100 according to the first embodiment is mounted. FIG. 5 is a flow chart showing a distribution process performed by a load balance control unit of the first stage. FIG. 6 is a flow chart showing a distribution process (re-distribution process) performed by the load balance control units of the second and subsequent stages. FIG. 7 is a diagram showing a format of a POS frame handled in the first embodiment. FIG. 8 is a diagram showing the configuration of a POS-PHY interface handled in the first embodiment.

As shown in FIG. 4, the load balancer 100 according to the first embodiment has the same configuration as that of the load balancer 100 shown in FIG. 1. However, in the first embodiment, a POS frame is applied as a frame transferred on a circuit, and a POS interface is applied as a line interface. For this reason, the communication device (a communication data input control unit 22) according to the first embodiment has a POS interface unit (POS-PHY interface unit) 1A serving as a receiving means corresponding to the line interface unit, and performs a process for a POS frame received by the POS interface unit 1.

As shown in FIG. 7, the POS frame is constituted by an SONET/SDH frame and a PPP frame. The reference symbol POS is an abbreviation of "Packet Over SONET/SDH" which is a protocol for transmitting a PPP (Point to Point Protocol) on SONET/SDH, and is regulated by RFC-1661 or the like (RFC is a document obtained by collecting pieces of information such as protocols related to the internet).

In short, the SONET/SDH frame corresponds to layer 1 of an OSI reference model, and the PPP frame corresponds to layer 2. Reference symbol SOH in FIG. 7 is abbreviation of "Section Over Head" which is an area in which information of layer 1 of the SONET/SDH frame is stored. Payload indicates an area in which user data is stored. The PPP frame is stored in the payload.

The PPP frame employs a HDLC-like frame configuration. Data of layer 3 such as IPv4 or IPv6 is stored in an Information area in the PPP packet. Information representing a protocol of layer 3 stored in the Information area is stored in a Protocol ID area. As protocol IDs, for example, IPv4 is regulated by "0x0021", and IPv6 is regulated by "0x0057.

Returning to FIG. 4, when the POS interface unit 1A receives a POS frame, the POS interface unit 1A remove a frame header (SOH9 of the SONET/SDH, the Flag of the PPP frame stored in the payload and the frame from which FCS is remove are transmitted to the load balance control units 2 and the phase correction unit 3 by using the POS-PHY interface.

The POS-PHY interface is a general interface for parallel transmitting a PPP frame. In general, a device for a line interface having a POS interface comprises a POS-PHY interface.

As the POS-PHY interface, an interface for data transfer between a PHY device and a LINK device is regulated. In FIG. 4, the POS interface unit 1A corresponds to the PHY device, and the load balance control units 2 and the phase correction unit 3 correspond to the LINK device.

FIG. 8A is a diagram showing a configuration image of the POS-PHY interface, FIG. 8B is a diagram showing a time chart of a signal transmitted from the PHY device to the LINK device, and FIG. 8C is a function explaining table of MOD [1:0].

In FIG. 8A, reference symbol CLK denotes a clock signal for data transfer. The clock signal is supplied to the PHY device and the LINK device. The PHY device transmits signals DATA, SOP, EOP, MOD, VALID, and ERR to the LINK device shynchronized with the signal CLK.

As shown in FIG. 8B, the signals DATA, SOP, EOP, MOD, VALID, and ERR are synchronized with the leading edge of the signal CLK.

DATA [31:0] is a data bus having a bit width of 32 bits. When the signal SOP is in "1 (ON)", the signal SOP represents that the start data of a frame is on DATA [31:0]. The start byte of the frame is determined to be arranged on the MSB side of DATA [31:24].

When the signal EOP is in "1 (ON)", the signal EOP represents that the final data of a frame is on DATA [31:0]. MOD [1:0 ] represents the number of invalid bytes on DATA [31:0] when EOP=1.

When ERR=1 is satisfied when EOP=1 is satisfied, the signal EER represents that the frame is an erroneous frame. The error frame is a troubled frame in which an FCS (Frame Check Sequence) error is detected when the POS interface unit 1A receives a POS frame.

When signal VALID is in "1", the signal VALID represents that the signals DATA, SOP, EOP, and MOD are valid. The time chart shown in FIG. 8B shows an example in which a normal frame (ERR=0) having a length of 10 bytes and an error frame (ERR=1) having a length of 19 bytes are transferred.

As shown in FIG. 8C, MOD [1:0] can employ four states of "00", "01", "10", and "11". When MOD [1:0] is in "00", MOD [1:0] represents that DATA [31:0] is valid data. When MOD [1:0] is in "01", MOD [1:0] represents that DATA [7:0 ] is invalid data. When MOD [1:0] is in "10", MOD [1:0] represents that DATA [15:0] is invalid data. When MOD [1:0 ] is in "11", MOD [1:0] represents that DATA [23:0] is invalid data.

The configuration according to the first embodiment is almost the same as that of the configuration shown in FIGS. 1 to 3 except for the above points. Therefore, the same points will be omitted.

An operation of the load balancer 100 according to the first embodiment will be described below with reference to the flow charts shown in FIGS. 5 and 6. In FIG. 5, when the communication device is powered on, or when the reset is canceled, the CPU 10 performs initial settings to the load balance control units 2 through the CPU bus (step (to be referred to as "S" hereinafter) 01). More specifically, the CPU 10 performs, as the initial settings, an ON/OFF setting of load balance control, a setting of a DBG mode, a setting of a fixed distribution destination value in the ON state of the DBG mode, and a setting of a generation polynomial used in a distribution process to the load balance control unit 2-#1.

As a matter of course, the CPU 10 also performs the initial settings to the load balance control units 2 of the second and subsequent stages (S01 in FIG. 6). However, the CPU 10 sets the load balance control in an ON state for only the load balance control unit 2-#1, and the CPU 10 sets load balance control unit 2 in an OFF state.

The DBG mode means a Debug (test/evaluation) mode. When the DBG mode is in an ON state (S02: YES), a fixed distribution destination value (route number) set in advance is transmitted to the selector 5 as a route selection signal (S14). For this reason, when the DBG mode is set in an ON state, distribution is not performed by load balance control, and a frame can be transmitted to the fixedly set route. Therefore, a load test of a frame, an operational evaluation of a load balance control unit, or the like can be efficiently performed in an evaluation state or a test state. This DBG mode has an additional configuration for the load balancer according to the present invention, and can be added or deleted if necessary.

A distribution algorithm (load balance control) used in the first embodiment is obtained by dividing the address bit of a frame input to the load balance control unit 2 by a set generation polynomial. When the number of mounted NWPs 8 is N (N is an integer which is 1 or more), a generation polynomial is set such that the residual of the division is N−1 or less. This can be realized such that the maximum degree of the generation polynomial is set to be N. When the residual is L (L is an integer which is 0 or more), a frame is transmitted to the (L+1)th NWP 8. For example, when the number of mounted NWPs 8 is 5, a generation polynomial having the maximum degree of 5 is set such that the residual is 4 or less. When the residual obtained in the division of the address bit performed by the generation polynomial is 0, a frame is transmitted to the NWP 8-#1. When the residual is 4, the frame is transmitted to the NWP 8-#5.

The load balance control unit 2-#1 recognizes the start byte of the frame is on DATA when VALID=1 and SOP=1 are received on the POS-PHY interface (S03; YES), and the load balance control unit 2-#1 searches for a protocol ID representing a protocol of layer 3 stored in the Information field (S04, S05, and S06).

At this time, when the phase correction unit 3 and the load balance control unit 2 simultaneously receive VALID=1 and SOP=1, the frame is stored in an FIFO arranged inside the phase correction unit 3 until a frame transmission enabling signal from the load balance control unit 2-#1 is turned on, and transmission to the distribution unit 7 is stopped. This is because a frame is prevented from being transmitted to the distribution unit 7 before a distribution destination is determined by a frame distribution process performed by the load balance control unit 2-#1.

The load balance control unit 2 performs a decision for checking whether the protocol ID of an input frame is IPv4 or not (S04) or a decision for checking whether the protocol ID is IPv6 or not (S05), and a decision for checking whether the protocol ID is MPLS (MultiProtocol Label Switching) or not. In this case, it is checked whether the protocol ID is MPLS, IPv4, IPv6, or not for the following reason. That is, On the POS frame, most user data are protocols MPLS, IPv4, and IPv6, and is supposed that the rates of other protocols are considerably lower than the rates of the protocols MPLS, IPv4, and IPv6. For this reason, it is considered that communication quality is not adversely affected even though frames are concentrically distributed to a specific NWP 8.

When the load balance control unit 2-#1 detects a protocol except for the protocols MPLS, IPv4, and IPv6 (S06: NO), the load balance control unit 2-#1 causes the corresponding frame to be always transmitted to a specific NWP 8 (in this case, NWP 8-#1) in order to simplify control of the hardware by fixing a distribution destination (assignment destination). This is realized such that a value (in this case, "0") which means distribution to the NWP 8-#1 as a route selection signal.

When the load balance control unit 2-#1 detects the protocols MPLS, IPv4, and IPv6, the load balance control unit 2-#1 performs arithmetic processes (frame distribution processes) corresponding to the respective protocols (S07, S08, and S09). In each of the arithmetic process, the load balance control unit 2-#1 searches for an address field of a protocol, and performs division to address bits stored in the address field by a set generation polynomial.

Subsequently, the load balance control unit 2-#1 transmits a residual obtained by the division to the selector 5 as a route selection signal (S10). In addition, the load balance control unit 2-#1 performs transmission control for turning the flame transmission enabling signal off->on->off to the selector 4 when the arithmetic operation which can obtain the result of the division is completed or when transmission of the route selection signal is completed (S12 and S13).

At this time, since a status signal from the load balance control unit 2-#1 is ON, and since status signals from the other load balance control units 2 are OFF, the decode unit 6 gives a selector signal "0" to the selectors 4 and 5.

A selector signal "X−1" means that a route selection signal and a the flame transmission enabling signal output from the load balance control unit 2 of the X stage are selected by the selectors 4 and 5, respectively. When the selector signal is "0", the flame transmission enabling signal transmitted from the load balance control unit 2-#1 is given to the phase correction unit 3 through the selector 4, and the route selection signal is given to the distribution unit 7 through the selector 5.

Thereafter, the phase correction unit 3 transmits the frame temporarily stored in the FIFO to the distribution unit 7 when the frame transmission enabling signal is turned on. The distribution unit 7 selects the NWP 8 to which the frame should be transmitted according to the route selection signal. For example, when the route selection signal "1", the distribution unit 7 performs a control for transmitting the frame to the NWP 8-#2. In this manner, the frame transmitted from the phase correction unit 3 is given to the NWP 8 corresponding to the distribution destination through the distribution unit 7. The load balancer 100 operates as described above when no eccentricity is generated in the distribution process performed by the load balance control unit 2-#1 of the first stage.

When the distribution process of frames performed by the load balance control unit 2-#1, generates eccentricity of frame distribution the load balancer 100 operates as follows.

In FIG. 6, the load balance control unit 2-#2 of the second stage supervises distribution information transmitted from the load balance control unit 2-#1 when the load balance control of the load balance control unit 2-#1 of the first stage is in an ON state to check whether eccentricity of distribution is generated or not (S101).

Each time the load balance control unit 2 corresponding to the next stage generates a route selection signal for a frame, the load balance control unit 2 input the route selection signal to the load balance control unit 2 of the next stage as distribution information (distribution result). The load balance control unit 2 of the next stage counts distributions per unit time for each route (NWP 8) on the basis of the distribution information from the load balance control unit 2 of the previous stage. Predetermined threshold values are set (set by initial settings performed by the CPU 10) for the numbers of distributions per unit time. When the number of distributions per unit time for a certain route exceeds the threshold value, the load balance control units 2 of the second and subsequent stages decide that the distribution destination of the frame is eccentric to the route, and detects this as eccentricity.

When the load balance control unit 2-#2 detects eccentricity in distribution of frames (S101; YES), the load balance control unit 2-#2 turns on a distribution algorithm (load balance control) of the load balance control unit 2-#2 (S102). Thereafter, the load balance control unit 2-#2 decides whether a frame input from the POS interface unit 1 is a frame for a route in which eccentricity is generated or not (S103).

The load balance control unit 2 of the next stage performs a process for a frame input to the corresponding load balance control unit 2 in synchronism with a distribution result (route selection signal serving as distribution information) obtained by the load balance control unit 2 of the previous stage for the frame. It is decided whether the distribution result for the frame is a route selection signal of a route in which eccentricity is generated or not, so that it is decided whether the corresponding frame is for the route in which eccentricity is generated or not.

When the input frame is for the route in which eccentricity is generated (S103; YES), the load balance control unit 2-#2 performs a distribution process of the frame again, and generates a route selection signal having a value different from that of the route selection signal obtained as a distribution result to transmit the route selection signal to the selector 5 (S04 to S10 in FIG. 6).

In contrast to this, when the input frame is not for the route in which eccentricity is generated (S103; NO), the load balance control unit 2-#2 directly transmits the route selection signal obtained as a distribution result for the frame to the selector 5 (S104).

The route selection signal transmitted from the load balance control unit 2-#2 to the selector 5 is given to the load balance control unit 2-#3 of the next stage as distribution information and used to supervise the load balance control unit 2-#3 of the next stage and in an eccentricity detection process.

After the load balance control unit 2-#2 transmits the route selection signal, the load balance control unit 2-#2 performs OFF R ON R OFF-control for the frame transmission enabling signal (S12 and S13 in FIG. 6). For example, in frame distribution performed by the load balance control unit 2-#1, frame distribution is concentrated on the NWP 8-#1. When eccentricity is generated, the load balance control unit 2-#2 detects that frames for the NWP 8-#1 are eccentric by supervising distribution information. The load balance control unit 2-#2 autonomously switches the state of the load balance control of the load balance control unit 2-#2 from an OFF state to an ON state, and performs division for only the frames for the NWP 8-#1 by a generation polynomial different from that of the load balance control unit 2-#1 of the first stage. On the other hand, since frames for the NWPs 8 except for the NWP 8-#1 are not eccentric, the load balance control unit 2-#2 directly uses distribution of the load balance control unit 2-#1 and transmits a route selection signal obtained as distribution information.

When the status signal of the load balance control unit 2-#2 is switched from OFF to ON, the decode unit 6 changes a selector signal from "0" to "1" (means that an output from the load balance control unit 2-#2 is selected) and transmits the selector signal to the selector 4 and the selector 5.

Therefore, the selector 4 selects a frame transmission enabling signal from the load balance control unit 2-#2 to input the frame transmission enabling signal to the phase correction unit 3. The selector 4 selects the route selection signal from the load balance control unit 2-#2 to input the route selection signal to the distribution unit 7.

With the above operation, frames concentrated on the NWP 8-#1 are dispersed to other routes (other NWPs 8) again in the load balance control unit 2-#2. In this manner, loads can be prevented from being more concentrated on the NWP 8-#1, and distribution destinations are dispersed, so that the distribution destinations can be prevented from being concentrated on another specific route. On the other hand, in the load balance control unit 2-#1 of the first stage, load balance control can be continuously performed without changing the distribution destinations of frames distributed to another route. Therefore, the route is not adversely affected by the re-distribution, and quality of communication can be maintained.

Thereafter, when eccentricity of frame distribution is not solved even though the load balance control unit 2-#2 of the second stage is turned on, or when eccentricity of frames to another route is generated, the load balance control of the load balance control unit 2-#3 of the third stage corresponding to the next stage is turned on. The load balance control unit 2-#3 performs the same load balance control (see FIG. 6) as that of the load balance control unit 2-#2. Load balance control for the next and subsequent stage is performed in such a form.

With the load balancer 100 according to the first embodiment, frames pass through the load balance control unit 2 of one stage to be dispersed to respective routes. The load balance control units 2 of the second and subsequent stages re-distribute only frames which are eccentric to a specific route For this reason, the load balance of the frames becomes uniform each time the frames pass through the stages while minimizing affect to another route. In this manner, loads on the NWPs 8 can be uniformly balanced while distribution of frames to the NWPs 8 on which loads are not concentrated.

Second Embodiment

Figure 9:
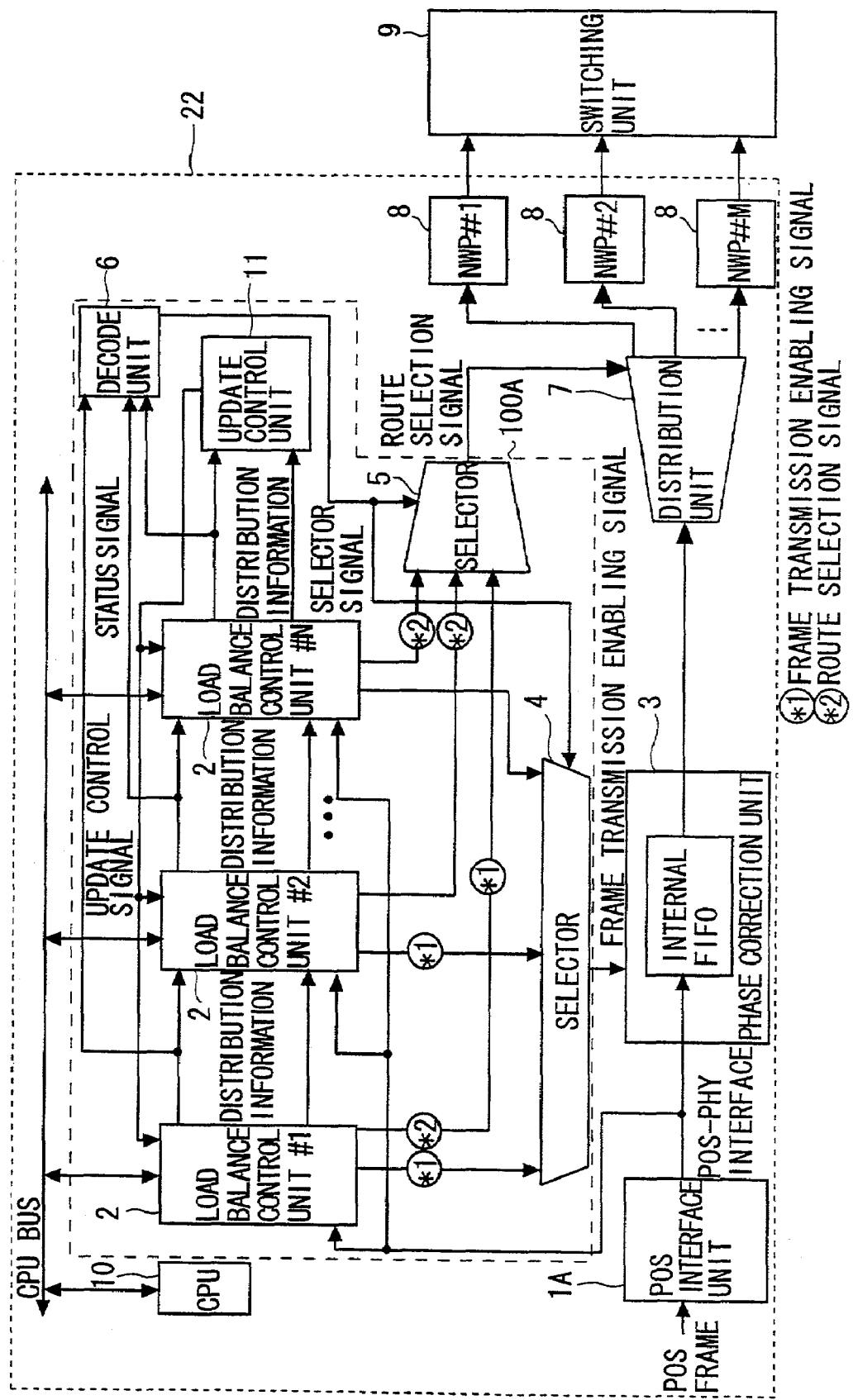
FIG. 9 is a block diagram showing the second embodiment of a load balancer.
Figure 10:
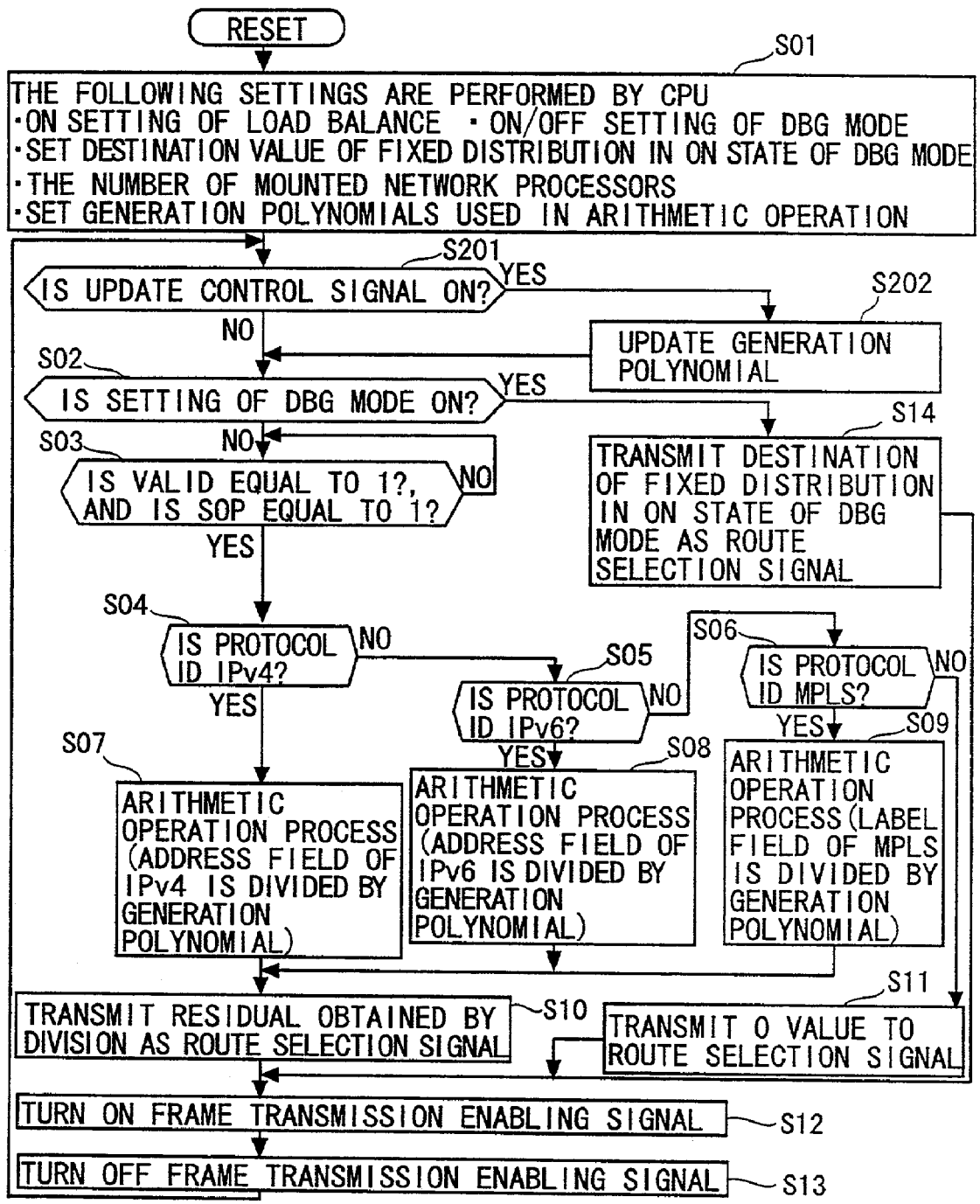
FIG. 10 is a flow chart showing processes of a load balance control unit of the first stage according to the second embodiment.
Figure 11:
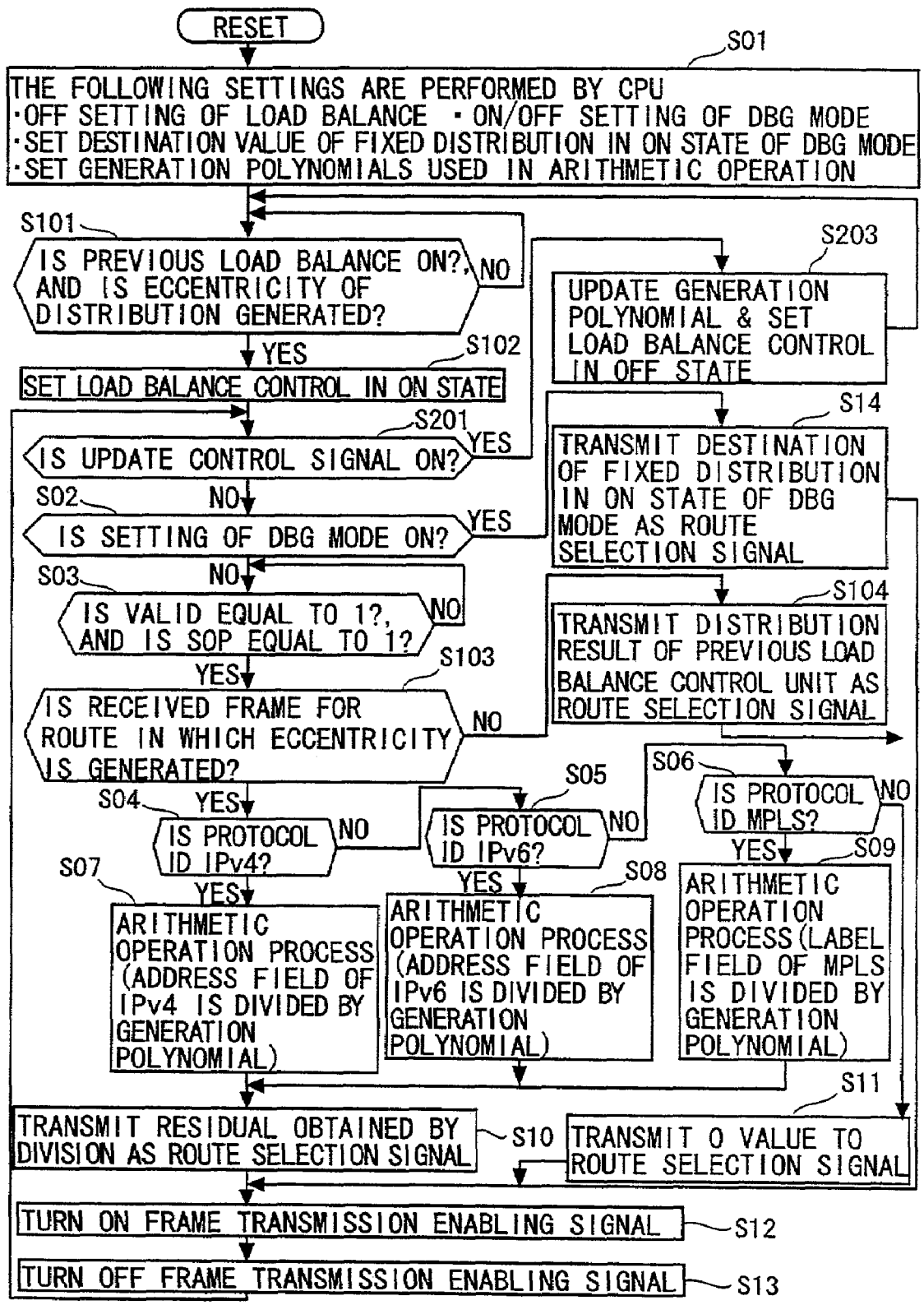
FIG. 11 is a flow chart showing processes of load balance control units of the second and subsequent stages according to the second embodiment.

The second embodiment of a load balancer according to the present invention will be described below with reference to FIGS. 9, 10, and 11. FIG. 9 is a diagram showing a main constituent element (a communication data input control unit 22 of a line interface card 21) of a communication device on which the second embodiment of the load balancer is mounted. FIG. 10 is a flow chart showing processes of a load balance control unit 2 of the first stage in the second embodiment, and FIG. 11 is a flow chart showing processes of each of the load balance control units 2 of the second and subsequent stages in the second embodiment. Since the second embodiment has something in common with the first embodiment, the points of sameness will be omitted, and only different points will be described below.

As shown FIG. 9, a load balancer 100A according to the second embodiment has a configuration obtained by adding an update control unit 11 to the load balancer 100 according to the first embodiment. The update control unit 11 supervises a status signal representing an ON/OFF operation of a load balance operation (distribution process) of a load balance control unit 2-#N of the Nth stage and distribution information. The method of supervising the load balance control unit 2-#N of the final stage and the method of detecting eccentricity are the same as the methods used in the load balance control units 2 of the second and subsequent stages.

The update control unit 11 gives an update control signal to all the load balance control units 2 when the load balance control of the load balance control unit 2-#N is in an ON state and when eccentricity is generated in frame distribution of the load balance control unit 2-#N. The update control signal is given such that the update control unit 11 performs transmission control for OFF R ON R OFF of the update control signal to the load balance control units 2.

In the second embodiment, when the load balance control of the load balance control unit 2-#N is in an ON state, and when eccentricity is generated in frame distribution of the load balance control unit 2-#N, it is considered that the eccentricity of the frames is not solved even though all the load balance control units 2 of the N stages are used. The update control signal is given to all the load balance control units 2.

As shown in FIG. 10, the load balance control unit 2-#1 of the first stage is designed to supervise the ON state of the update control signal obtained by the update control unit 11 (S201). When the ON state of the update control signal is detected (S201; YES), a generation polynomial used in a frame distribution process is updated (S202).

On the other hand, as shown in FIG. 11, the load balance control unit 2-#2 to N of the second and subsequent stages, like the load balance control unit 2-#1, supervises the ON state of the update control signal obtained by the update control unit 11 (S201). When the ON state of the update control signal is detected (S201; YES), the generation polynomial used in the frame distribution process is updated, and the load balance control (distribution process) of the corresponding load balance control unit 2 is turned off (S203).

In this manner, the generation polynomials of the load balance control unit 2 are updated, and only the load balance control unit 2-#1 of the first stage is turned on, so that re-distribution of frames is started. In each of the load balance control units 2, a plurality of different generation polynomials to be updated are set by the CPU 10 in initial settings. For this reason, a generation polynomial that can perform optimum load balance can be finally selected.

Third Embodiment

Figure 12:
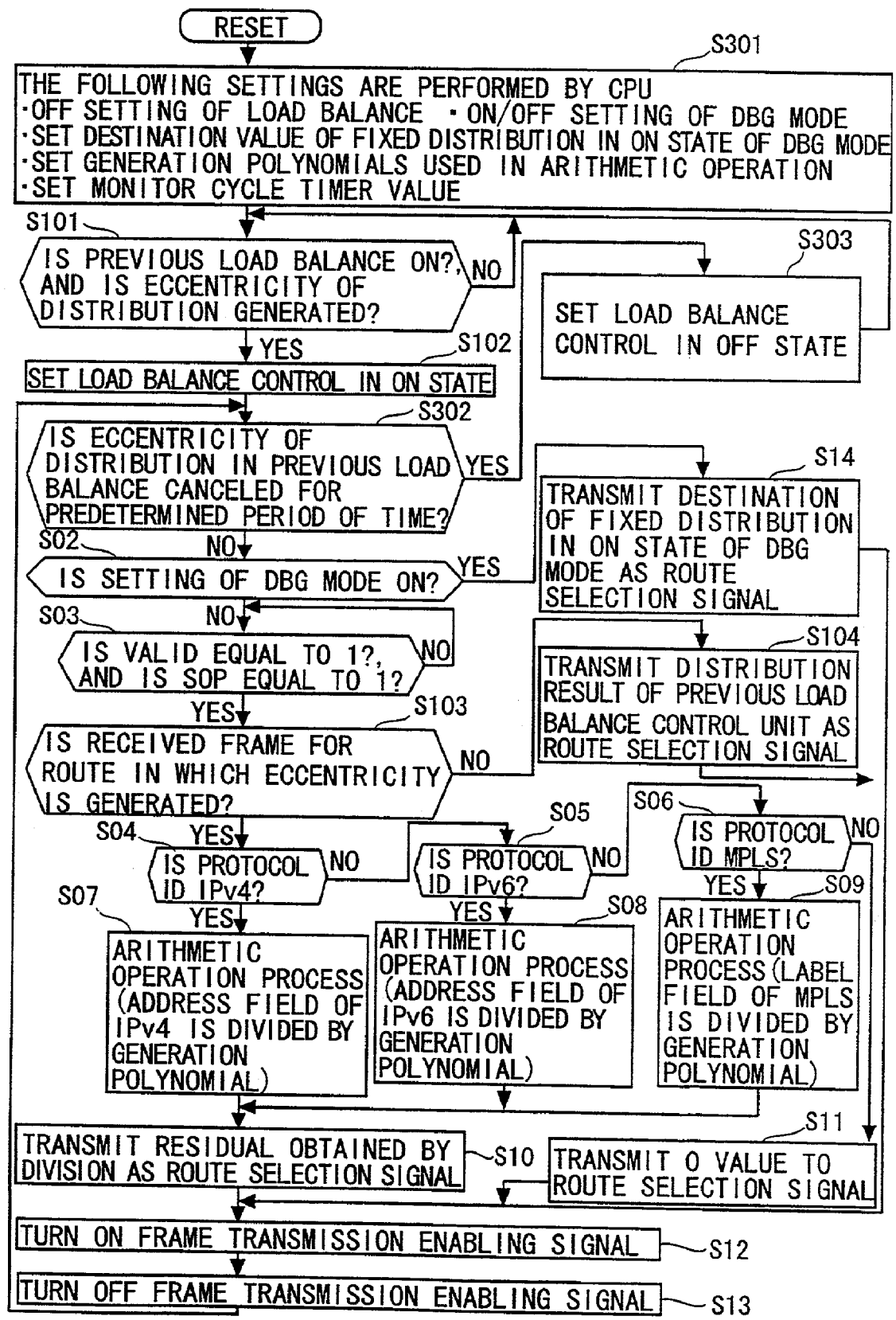
FIG. 12 is a flow chart showing processes of load balance control units of the second and subsequent stages according to the third embodiment.

The third embodiment of a load balancer according to present invention will be described below with reference to FIGS. 4, 5, and 12. FIG. 12 is a flow chart showing processes of load balance control units 2 of the second and subsequent stages in the third embodiment. Since the third embodiment has something in common with the first embodiment, the points of sameness will be omitted, and different points will be mainly described below.

In the third embodiment, the respective load balance control units 2 of the second and subsequent stages perform operations shown in the flow chart in FIG. 12. A load balance control unit 2-#1 performs operations shown in the flow chart in FIG. 5 as in the first embodiment.

In the third embodiment, the load balance control units 2 of the second and subsequent stages have timers for supervising a frame distribution state obtained by the load balance control unit 2 of the previous stage. As shown in FIG. 12, the CPU 10 sets a timer value in initial settings (S301). As the timer value, a relatively large value (e.g., 1 hour or longer) can be set.

The load balance controls of the load balance control units 2 of the second and subsequent stages are turned on when eccentricity of distribution in the load balance control unit 2 of the previous stage. However, the transmission state of frames changes with time, and the eccentricity of distribution destinations (routes) caused by the distribution process of the load balance control unit 2 of the previous stage (the number of distributions per unit time is smaller than the threshold value). In this case, the load balance control units 2 of the second and subsequent stages need not perform re-distribution of frames to a route in which eccentricity is generated by the load balance control of the load balance control units 2.

For this reason, when the state of solved eccentricity continues for time (e.g., 1-hour cycle) of the timer (S302) the load balance control units 2 of the second and subsequent stages autonomously switch the states of load balance control of the load balance control units 2 from ON states to OFF states (S303). In this manner, a limited number of stages of load balance control can be effectively used.

Fourth Embodiment

Figure 13:
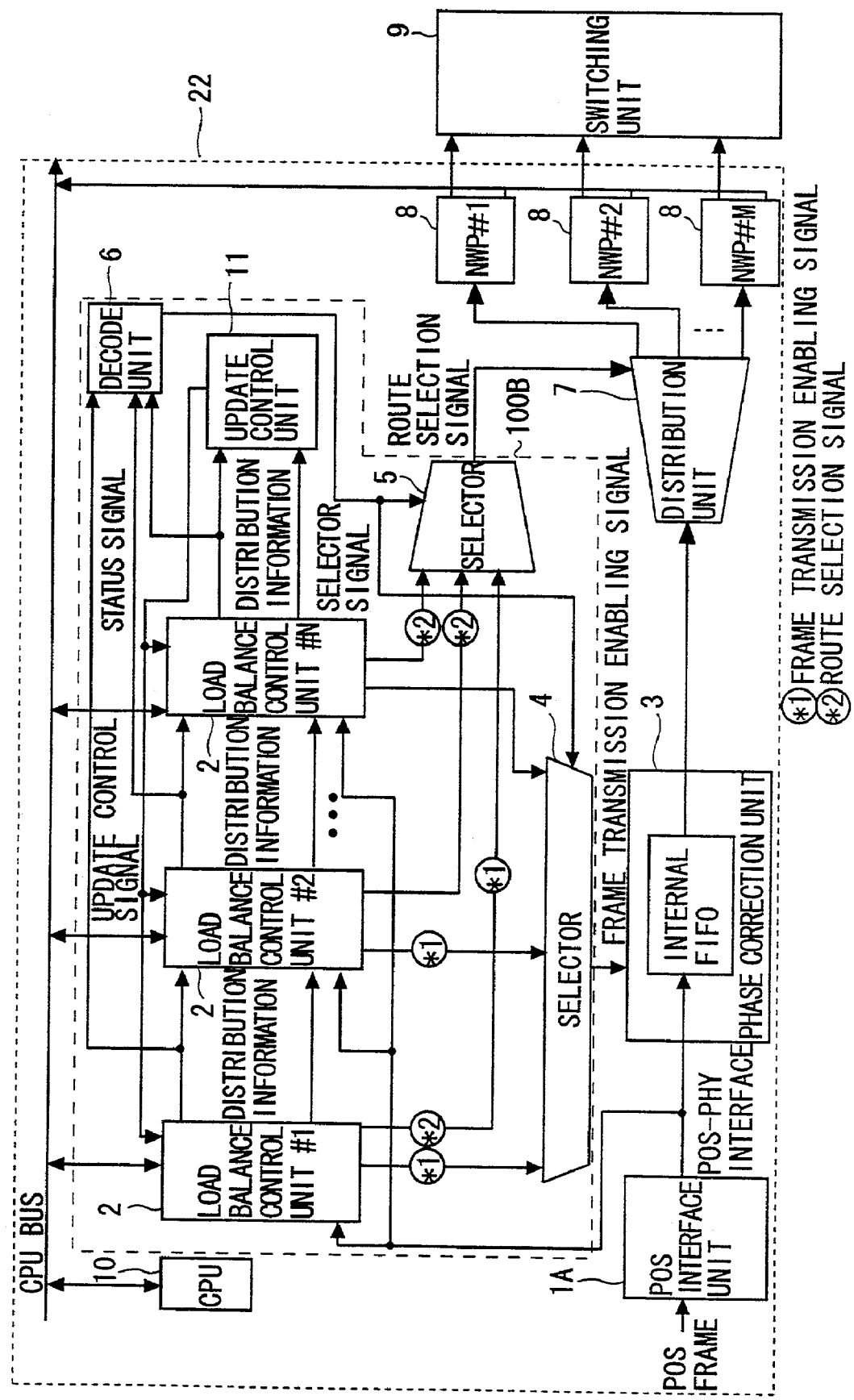
FIG. 13 is a block diagram showing the fourth embodiment of a load balancer.
Figure 14:
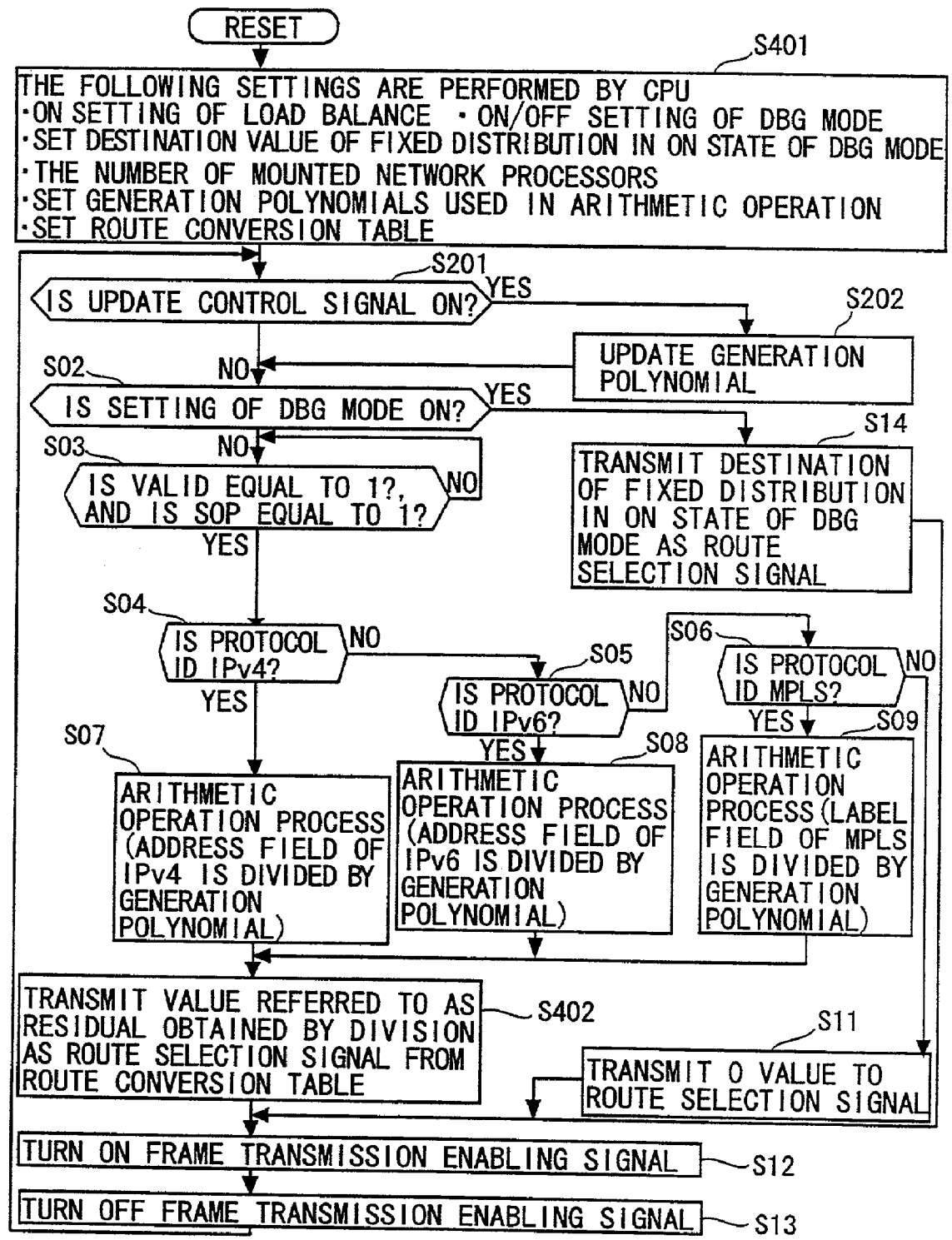
FIG. 14 is a flow chart showing processes of a load balance control unit of the first stage according to the fourth embodiment.
Figure 15:
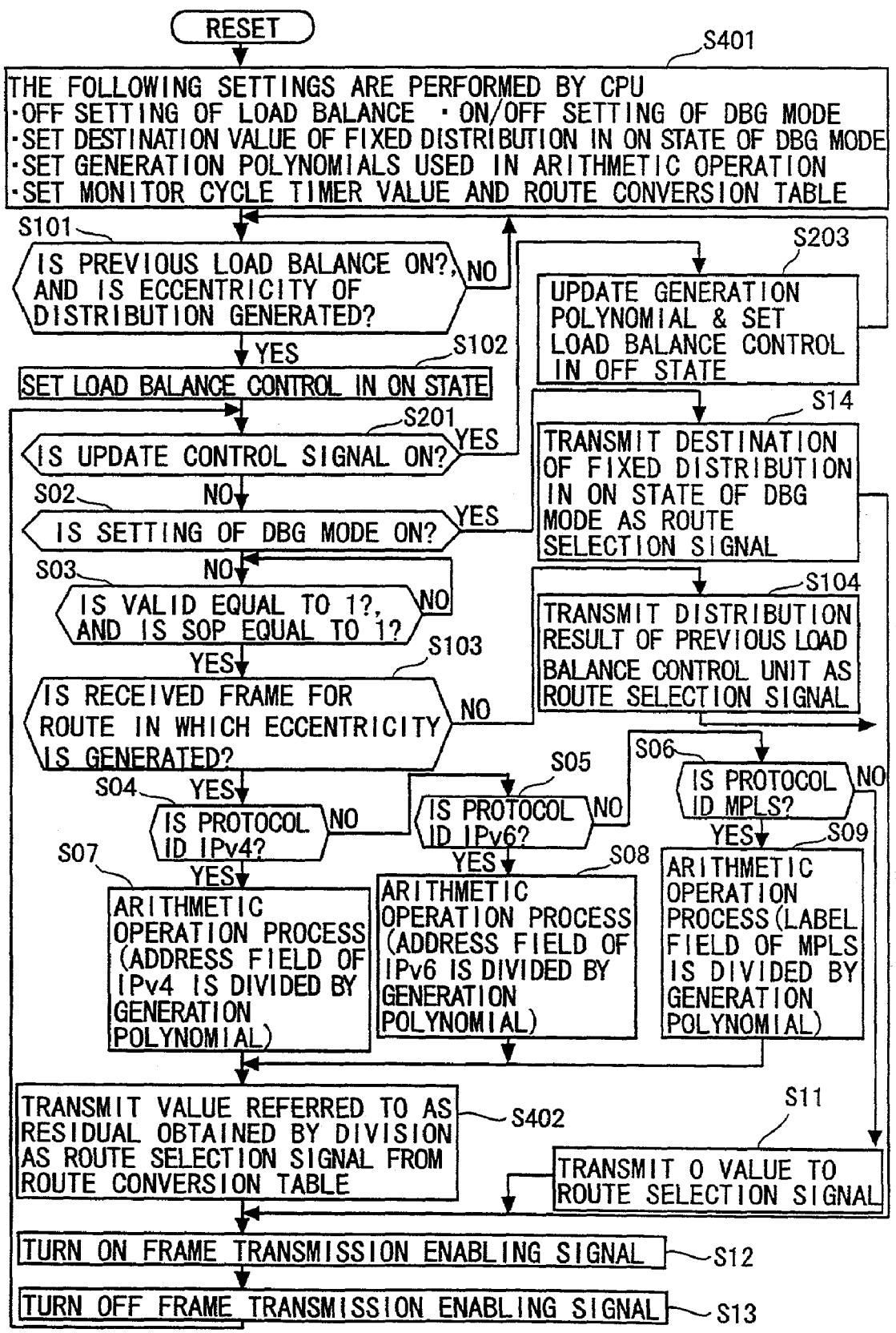
FIG. 15 is a flow chart showing processes of load balance control units of the second and subsequent stages according to the fourth embodiment.

The fourth embodiment of a load balancer according to the present invention will be described below with reference to FIGS. 13, 14, 15, and 16A to 16C. FIG. 13 is a diagram of a main constituent element (a communication data input control unit 22 of a line interface cards 21) of a communication device on which the fourth embodiment (a load balancer 100B) of the load balancer is mounted. FIG. 14 is a flow chart showing processes of a load balance control unit 2 of the first stage in the fourth embodiment, and FIG. 15 is a flow chart showing processes of each of load balance control units 2 of the second and subsequent stages in the fourth embodiment. Since the fourth embodiment has something in common with the first embodiment, the points of sameness will be omitted, and different points will be mainly described below.

As shown in FIG. 13, in the fourth embodiment, each NWP 8 has a CPU interface, and communicates with a CPU 10 through a CPU bus. The CPU 10 supervises the normality of the NWPs 8 through the CPU bus. When a trouble occurs in a specific NWP 8, the CPU 10 immediately recognizes the NWP 8, which has a trouble. For example, the CPU 10 recognizes occurrence of a trouble by detecting an alarm from the troubled NWP 8.

In the fourth embodiment, when a specific NWP 8 is troubled, in order to prevent a frame distributed to the corresponding NWP 8 from being impossible to be communicated and from being wasted, the CPU 10 begins to reset the load balance control units 2, and sets new generation polynomials set while being conscious of the number of NWPs 8. This means the following fact. That is, it is assumed that N NWPs 8 operate in a normal state. In this case, a generation polynomial having a maximum degree of N is set such that a residual is N−1 or less. However, when a certain NWP 8 is troubled, a generation polynomial having a maximum degree of N−1 is updated such that the residual is N−2 or less.

Since route numbers are assigned to the plurality of NWPs 8 such that the NWPs 8 one-to-one-correspond to residuals of division, a method of converting the numbers is required. For example, when 5 NWPs 8 are mounted, route numbers 0 to 4 are assigned to the NWPs 8-#1 to 5, respectively, and a generation polynomial having a maximum degree of 5 is set in the initial state such that a residual obtained by division made by the generation polynomial is 4 or less.

When the NWP 8-#4 is troubled, the number of NWPs 8 that can normally operate is four. For this reason, the setting is changed to a generation polynomial having a maximum degree of 4 such that the residual of division is 3 or less. However, since the normal NWPs 8 are four NWPs #1, #2, #3, and #5 (#4 is troubled), even though only the generation polynomial is changed, a frame is transmitted to the NWP 8-#4 when the residual is 3. For this reason, when the residual is 3, the relationship between a residual of division and a route selection signal in a normal state must be converted into the relationship a residual of division and a route selection signal in an abnormal state.

In the fourth embodiment, each of the load balance control units 2 has a route number conversion table for converting the relationship between a residual of division and a route selection signal, and performs initial settings (setting contents of the route number conversion table are changed) through the CPU 10 in the initial settings performed after the load balance control unit 2 is reset.

FIGS. 16A to 16C show examples of the route number conversion table. In the examples in FIGS. 16A to 16C, 8 NWPs 8 are mounted on a communication device. FIGS. 16A to 16C show the setting contents of the route number conversion tables when all the NWPs 8 are normal (FIG. 16A), when the NWP 8-#3 is troubled (FIG. 16B), and when the NWP 8-# and the NWP 8-#5 are troubled (FIG. 16C).

CPU 10 has master data of a route number conversion table of all trouble generation patterns (including normal patterns), and writes setting contents depending on the trouble generation patterns in the route number conversion tables of the load balance control units 2 in the initial settings (S401 in FIGS. 14 and 15).

On the other hand, when a residual of division is calculated by one of the arithmetic processes in S04, S05, and S06, the load balance control units 2 refer to the route number conversion tables to acquire route selection signals having values corresponding to the residuals and transmit the route selection signals (S402 in FIGS. 14 and 15).

With the above arrangement, even though an NWP 8 is troubled, frames can be rapidly assigned to normal NWPs 8. An influence caused by the trouble can be minimized until the troubled NWP 8 is changed into a normal NWP 8 by an exchange or the like.

In the flow charts shown in FIGS. 14 and 15, a case in which an NWP 8 to which a frame of a protocol other than the protocols IPv4, IPv6, and MPLS is assigned is troubled is not considered. However, the following configuration may be employed. That is, the setting contents of the route number conversion tables are formed on the assumption that the NWP 8 is troubled, and the load balance control unit 2 refers to the route number conversion table in S11 when NO is decided in S06, so that the load balance control unit 2 acquires a value (route selection number) of a route selection signal of an NWP 8 to which a frame of a protocol other than the protocols IPv4, IPv6, and MPLS is assigned and transmits the value. In addition, with respect to a fixed distribution destination (S14) in a DBG mode, the same method as described above can be employed.

[Modification]

The principle of the present invention and the communication devices (line interface cards) described in the first to fourth embodiments can be modified as follows. As the first modification, when a phase correction unit 3 receives a frame having an incomplete frame length or an error frame, the phase correction unit 3 may perform a nullifying process of the frame to reduce the load on the NWP 8.

The frame having an incomplete frame length means a frame that does not have an essential frame length. The frame can be checked by each of the load balance control units 2 by checking the information of a frame length field stored in the header of each protocol. The error frame means a frame which satisfies EOP=1 and ERR=1 on a POS-PHY interface.

In the first modification, when a frame which satisfies SOP=1 is received and stored in an FIFO, if the phase correction unit 3 receives an ON frame transmission enabling signal, the phase correction unit 3 is on standby for frame transmission until EOP=1 is satisfied. Thereafter, when the phase correction unit 3 receives a frame which satisfies EOP=1, the phase correction unit 3 checks a frame length and the state of an ERR signal. If the frame length and the state are normal, the phase correction unit 3 transmits the frame to the distribution unit 7. When the phase correction unit 3 receives a frame having a wrong frame length and an error frame, the phase correction unit 3 nullifies the entire frame. The disuse of the frame can be easily realized such that an address pointer is forcibly returned to an address immediately before an FIFO address at which the data of SOP=1 is stored.

According to the first embodiment, when an abnormal frame is received, the frame is nullified without being transmitted to the NWP 8 to make it possible to reduce the load on the NWP 8.

As the second embodiment, a load balancer 100 may have a redundant configuration such as a two-array configuration. In this case, the same generation polynomials as generation polynomials set in load balance control units 2 of a load balancer of an active system are set in load balance control units 2 of a load balancer of a standby system. This setting is performed by, e.g., a CPU 10 in initial settings.

According to the second modification, even though the systems are switched, the load balance control units 2 of a new active system can use generation polynomials that had been used just before in an old active system. For this reason, after the systems are switched, optimum load balance control can be instantaneously provided.

As the third modification, a display device (display) serving as a display means is connected to a CPU bus. As distribution conditions used in load balance control units which execute distribution processes, as distribution states of input information to network processors, and as the number of load balance control units which are set in such states that distribution processes are executed, frame distribution statuses obtained by the load balance control units 2 of the respective stages, a ratio of distributions to respective routes, the numbers of transmission frames in units of routes, a load balance control unit which is set in an ON state at present, a generation polynomial which is selected at present, and the like may be displayed on the display such that the CPU 10 executes software.

According to the third modification, a load balance state of the entire system (entire load balancer) is disclosed to network administrators and users, so that operation management can be easily performed.

As described above, according to the present invention, load balance control units are multistage-connected to each other. For this reason, even though eccentricity is generated in distribution of frames, distribution is performed again by a load balance control unit of the next stage to only a frame for the route the eccentricity is generated, so that optimum load balance control can be provided without adversely affecting frames for other routes.

Optimum load balance control can be rapidly provided even in generation of a trouble of an NWP or in a redundant configuration of a load balancer, and the maximum capability an NWP 8 in the communication device can be brought out. Therefore, the present invention can greatly contribute to an improvement in performance of the communication device and providing of a reliable network.

What is claimed is:

1. A load balancer for network processors comprising:
   load balance control units connected in series, each of the load balance control units receiving input information received by receiving means to execute a distribution process for determining, as a distribution destination of the input information, one of the network processors according to a predetermined distribution condition, per input information,
   wherein upon commencement of the reception of the input information by the receiving means, only the load balance control unit of a first stage executes the distribution process, each of the load balance control units of the second and subsequent stages following the load balance control unit of the first stage monitors the distribution process executed by the load balance control unit of a previous stage without executing the distributing process, when distribution destinations of the input information have been determined by the load balance control unit of the previous stage concentrates into a specific network processor within the network processors, starts the distribution process to perform re-determining a distribution destinations with respect to only the input information to which distribution to the specific network processor has been determined by the load balance control unit of the previous stage according to a distribution condition different from the distribution condition used in the load balance control unit of the previous stage;
   wherein each of the load balance control units which have already been started in the distribution process continue the distribution process regardless of commencement of the distribution process at the load balance control unit of a next stage.

2. The load balancer according to claim 1, further comprising an update control unit which supervises the distribution process executed by the load balance control unit of a final stage and updates distribution conditions used in all the load balance control units when distribution destinations of the input information determined by the load balance control unit of the final stage concentrates into a specific network processor.

3. The load balancer according to claim 1, wherein each of the load balance control units of the second and subsequent stages that is executing a distribution process with regard to the input information has been determined that distribution to the specific network processor by the load balance control unit of the previous stage stops the distribution process when a concentration of the distribution destinations of the input information by the load balance control unit of the previous stage is solved.

4. The load balancer according to claim 1, wherein each of the load balance control units distributes the input information received from the receiving means to a predetermined network processor without executing the distribution process.

5. The load balancer according to claim 1, wherein each of the load balance control units changes, when a failure occurs on one of the network processors, distribution conditions used on the distribution, process into alternative distribution conditions corresponding to distribution destinations except for the network processor having the failure.

6. A communication device comprising a load balancer including:
   receiving means;
   network processors for performing processes for input information received by the receiving means; and
   load balance control units that are multistage-connected in series, wherein each of the load balance control units receives the input information from the receiving means to execute a distribution process for detennining, as a distribution destination of the input information, one of the network processors according to a predetermined distribution condition per input information wherein upon commencement of the reception of the input information by the receiving means, only the load balance control unit of a first stage executes the distribution process, and each of the load balance control units of the second and subsequent stages following the load balance control unit of the first stage monitors the distribution process executed by the load balance control unit of a previous stage without executing the distributing process, when distribution destinations of the input information have been determined by the load balance control unit of the previous stage concentrates into a specific network processor within the network processors, starts the distribution processing to perform re-determining distribution destinations with respect to only the input information to which distribution to the specific network processor has been determined by die load balance control unit of the previous stage according to a distribution condition different from the distribution condition used in the load balance control unit of the previous stage;
   wherein each of the load balance control units which bave already been started in the distribution process continue the distribution process regardless of commencement of the distribution process at the load balance control unit of a next stage.

7. The communication device according to claim 6, wherein abnormal input information received by the receiving means is discarded without being given to one of the network processors.

8. The communication device according to claim 6, further comprising display means for displaying at least one of distribution conditions used in the load balance control units which execute the distribution processes, distribution states of input information to the network processors, and the number of load balance control units set in such states that the distribution processes are executed.

9. A communication device comprising:
receiving means;
network processors for performing processes for input information received by the receiving means; and
load balancers, wherein each of the load balancers includes load balance control units that are connected in series,
each of the load balance control units receives the input information from the receiving means to execute a distribution process for determining, as a distribution destination of the input information, one of the network processors according to a predetermined distribution condition per input information wherein upon commencement of the reception of the input information by the receiving means, only the load balance control unit of a first stage executes the distribution process,
and each of the load balance control units of the second and subsequent stages following the load balance control unit of the first stage monitors the distribution process executed by the load balance control unit of a previous stage without executing the distributing process, when distribution destinations of the input information have been determined by the load balance control unit of the previous stage concentrates into a specific network processor within the network processors, starts the distribution process to perform re-determining distribution destinations with respect to only the input information to which distribution to the specific network processor has been determined by the load balance control unit of the previous stage according to a distribution condition different from the distribution condition used in the load balance control unit of the previous stage, and
when one of the load balancers is used as an active-system and the other load balancers serve as standby-systems, distribution conditions which are used in the load balance control units included in the load balancer serving as the active-system are set in the load balance control units included in the load balancers serving as the standby-systems;
wherein each of the load balance control units which have already been started in the distribution process continue the distribution process regardless of commencement of the distribution process at the load balance control unit of a next stage.

* * * * *

UNITED STATES PATENT AND TRADEMARK OFFICE
CERTIFICATE OF CORRECTION

PATENT NO. : 7,310,674 B2
APPLICATION NO. : 10/116593
DATED : December 18, 2007
INVENTOR(S) : Yasuyuki Mitsumori It is certified that error appears in the above-identified patent and that said Letters Patent is hereby corrected as shown below:

Claim 5, column 20, line 18: "...used on the distribution, ..." should be changed to ...used on the distribution...

Claim 6, column 20, line 29-30: "...detennining..." should be changed to ...determining...

Claim 6, column 20, line 49: "...die..." should be changed to ...the...

Signed and Sealed this

Eighth Day of July, 2008

JON W. DUDAS
*Director of the United States Patent and Trademark Office*